US009917868B2

(12) United States Patent
Ahmed

(10) Patent No.: US 9,917,868 B2
(45) Date of Patent: Mar. 13, 2018

(54) SYSTEMS AND METHODS FOR MEDICAL DIAGNOSTIC COLLABORATION

(71) Applicant: General Electric Company, Schenectady, NY (US)

(72) Inventor: Rizwan Ahmed, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/462,336

(22) Filed: Mar. 17, 2017

(65) Prior Publication Data
US 2017/0195377 A1 Jul. 6, 2017

Related U.S. Application Data

(63) Continuation of application No. 14/196,930, filed on Mar. 4, 2014, now Pat. No. 9,648,060.

(30) Foreign Application Priority Data

Nov. 27, 2013 (IN) .......................... 5453/CHE/2013

(51) Int. Cl.
*G06F 15/16* (2006.01)
*H04L 29/06* (2006.01)
(Continued)

(52) U.S. Cl.
CPC ............ *H04L 65/403* (2013.01); *H04L 51/04* (2013.01); *H04L 51/046* (2013.01); *H04L 67/12* (2013.01)

(58) Field of Classification Search
CPC ....... H04L 51/04; H04L 65/403; H04L 12/58; H04L 65/12
See application file for complete search history.

(56) References Cited

U.S. PATENT DOCUMENTS 7,593,918 B2 9/2009 Gentles et al.
2006/0235716 A1 10/2006 Mahesh et al.
(Continued)

OTHER PUBLICATIONS

Bruce I. Reiner, "Commoditization of PACS and the Opportunity for Disruptive Innovation", Society for Imaging Informatics in Medicine, J. Digit Imaging, Feb. 22, 2013, pp. 143-146.
(Continued)

*Primary Examiner* — Normin Abedin
(74) *Attorney, Agent, or Firm* — Hanley, Flight & Zimmerman, LLC

(57) ABSTRACT

Certain examples provide systems and methods for medical diagnostic collaboration. An example medical collaboration system includes an imaging service manager to provide a first device access to images from a database in response to a request received, the images to be viewed at the first device as first images; a collaboration server to access a request to initiate a conversation between the first device and a second device, in response to the conversation being initiated between the first device and the second device, the collaboration server to generate a study identifier that describes a viewport hanging protocol of the first images at the first device; a conversation manager to: access the images from the database in response to the second device launching the study identifier, the images to be viewed at the second device as second images; organize the second images based on the viewport hanging protocol; and enable the second images to be viewable at the second device to enable real-time collaboration between the first device and the second device.

21 Claims, 19 Drawing Sheets

(51) Int. Cl.
*H04L 12/58* (2006.01)
*H04L 29/08* (2006.01)

(56) References Cited

U.S. PATENT DOCUMENTS

| | | | |
|---|---|---|---|
| 2006/0236247 A1* | 10/2006 | Morita | G06F 19/321 |
| | | | 715/733 |
| 2007/0033249 A1 | 2/2007 | Samdadiya et al. | |
| 2009/0307755 A1 | 12/2009 | Dvorak et al. | |
| 2010/0080427 A1* | 4/2010 | Yeluri | G06F 19/321 |
| | | | 382/128 |
| 2011/0106881 A1 | 5/2011 | Douville et al. | |
| 2011/0126127 A1 | 5/2011 | Mariolli et al. | |
| 2012/0009906 A1 | 1/2012 | Patterson et al. | |
| 2012/0191467 A1 | 7/2012 | LaPlante et al. | |
| 2012/0191793 A1 | 7/2012 | Jakobovits | |
| 2012/0284635 A1 | 11/2012 | Sitrick et al. | |
| 2013/0173719 A1 | 7/2013 | Ahmed et al. | |
| 2014/0143298 A1 | 5/2014 | Klotzer et al. | |
| 2014/0143710 A1 | 5/2014 | Zhao et al. | |

OTHER PUBLICATIONS

Barton F. Branstetter IV, MD, "Basics of Imaging Informatics; Part 1". Radiology: vol. 243: No. 3—Jun. 2007, pp. 656-667.

Barton F. Branstetter IV, MD, "Basics of Imaging Informatics; Part 2". Radiology: vol. 244: No. 1—Jul. 2007, pp. 78-84.

Vivek Joshi, Kyootai Lee, David Melson and Vamsi R. Narra, "Empirical Investigation of Radiologists' Priorities for PACS Selection: An Analytical Hierarchy Process Approach", Journal of Digital Imaging, vol. 24, No. 4, (Aug. 2011), pp. 700-708.

William Hollingworth, PhD, Jeffrey G. Jarvik, MD, MPH, "Technology Assessment in Radiology: Putting the Evidence in Evidence-based Radiology", Radiology: vol. 244: No. 1—Jul. 2007, pp. 31-38.

Stan Schneider, PHD, "What is Real-Time SOA?", Real-Time Innovations, INC., Jun. 2010, 16 pages.

United States Patent and Trademark Office, "Non-final Office Action," issued in connection with U.S. Appl. No. 14/196,930, dated Nov. 16, 2015, 38 pages.

United States Patent and Trademark Office, "Final Office Action," issued in connection with U.S. Appl. No. 14/196,930, dated Jun. 7, 2016, 25 pages.

United States Patent and Trademark Office, "Non-final Office Action," issued in connection with U.S. Appl. No. 14/196,930, dated Sep. 22, 2016, 23 pages.

United States Patent and Trademark Office, "Notice of Allowance," issued in connection with U.S. Appl. No. 14/196,930, dated Jan. 13, 2017, 35 pages.

* cited by examiner

US 9,917,868 B2

SYSTEMS AND METHODS FOR MEDICAL DIAGNOSTIC COLLABORATION

RELATED APPLICATIONS

This arises from a continuation of U.S. patent application Ser. No. 14/196,930 filed Mar. 4, 2014, which claims the benefit of priority to Indian Patent Application No. 5453/CHE/2013 filed on Nov. 27, 2013. Priority is claimed to U.S. patent application Ser. No. 14/196,930 and Indian Patent Application No. 5453/CHE/2013. U.S. patent application Ser. No. 14/196,930 and Indian Patent Application No. 5453/CHE/2013 are hereby incorporated herein by reference in their entireties.

FIELD OF THE DISCLOSURE

This disclosure relates generally to medical diagnostic collaboration, and, more particularly, to systems and methods for medical image and information collaboration.

BACKGROUND

Prior to the rapid onset of digital imaging, patient images were "printed" to film. The film was "hung" and viewed by radiologists, who would then dictate a report. Reports were transcribed by individuals ranging for administrative staff to medical transcriptionists and sent to ordering physicians via mail or fax. Critical results were delivered by phone or pager and business statistics were managed via paper reports and spreadsheets. Diagnostic collaboration was facilitated during face-to-face meetings or teleconferences.

As information systems for radiology came to market, the first commercially available solutions addressed the needs of the radiologist and the radiology department. These included Radiology Information Systems (RIS) and dictation transcription systems. RIS systems managed the ordering, scheduling, patient and management reporting processes while radiologists were still reading from film.

As modalities started to support the digital display of images on workstations connected to the acquisition device, Picture Archiving and Communications Systems (PACS) came to market. These centrally store images and provide radiologists with the tools to read studies on networked computer monitors, replacing both film and modality workstations.

Over time, the needs of the market have evolved from supporting specialized radiologist workflows to supporting the open and dynamic needs of the enterprise and the community. The vendor community has added systems to manage the need for advanced technologies for improving diagnosis; sharing images between providers and organizations; and supporting collaboration between radiologists, physicians and teams providing care for the patient. These systems ultimately improve care by closing the loop on the reporting of critical results while managing the growing storage requirements. Often these are disparate, best-of breed systems that may or may not interoperate, increasing cost and decreasing productivity.

In a healthcare workflow, healthcare providers often consult or otherwise interact with each other. Such interaction typically involves paging or telephoning another practitioner. Thus, interaction between healthcare practitioners may be time- and energy-consuming. Therefore, there is a need for a system and method to simplify and improve communication and interaction between healthcare practitioners.

Furthermore, healthcare practitioners may want or need to review diagnoses and/or reports from another healthcare practitioner. For example, a referring physician may want to review a radiologist's diagnosis and report with the radiologist and/or a technician. As another example, an emergency room physician may need to review results of an emergency room study with the radiologist and/or a family physician. Thus, there is a need for a system and method to facilitate medical diagnostic collaboration to provide safe and effective treatment.

BRIEF SUMMARY

Certain examples provide systems, methods, and computer-readable media for medical diagnostic collaboration.

Certain examples provide a system including a conversation manager to facilitate a first conversation between a first device and a second device. The first conversation includes an exchange of data between the first device and the second device over a network. The first conversation is assigned a first conversation identifier that is maintained throughout the first conversation, and the conversation manager manages a plurality of conversations based on respective conversation identifiers assigned to each of the plurality of conversations. The example system also includes a collaboration session manager to facilitate, via the first conversation, a collaboration session between the first device and the second device. The collaboration session allows a user of the first device and a user of the second device to view, share, and comment on a medical study. In addition, the example system includes a context manager to manage context information to describe a state of the medical study as it is displayed on the first device. The collaboration session comprises sharing context information between the first device and the second device to synchronize a state of the medical study displayed on each of the first device and the second device.

Certain examples provide a tangible computer-readable storage medium including computer program code to be executed by a processor to implement a medical collaboration system. The example system includes a conversation manager to facilitate a first conversation between a first device and a second device. The first conversation includes an exchange of data between the first device and the second device over a network. The first conversation is assigned a first conversation identifier that is maintained throughout the first conversation, and the conversation manager manages a plurality of conversations based on respective conversation identifiers assigned to each of the plurality of conversations. The example system also includes a collaboration session manager to facilitate, via the first conversation, a collaboration session between the first device and the second device. The collaboration session allows a user of the first device and a user of the second device to view, share, and comment on a medical study. In addition, the example system includes a context manager to manage context information to describe a state of the medical study as it is displayed on the first device. The collaboration session comprises sharing context information between the first device and the second device to synchronize a state of the medical study displayed on each of the first device and the second device.

Certain examples provide a method including receiving, from a first device, a request to initiate a collaboration session with a second device, the collaboration session including a medical study. The example method includes receiving, from the second device, an acceptance of the request. The example method includes establishing the collaboration session between the first device and the second device over a messaging pipeline. The example method includes sharing context information between the first device and the second device to synchronize a state of the medical study displayed on each of the first device and the second device.

Figure 1:
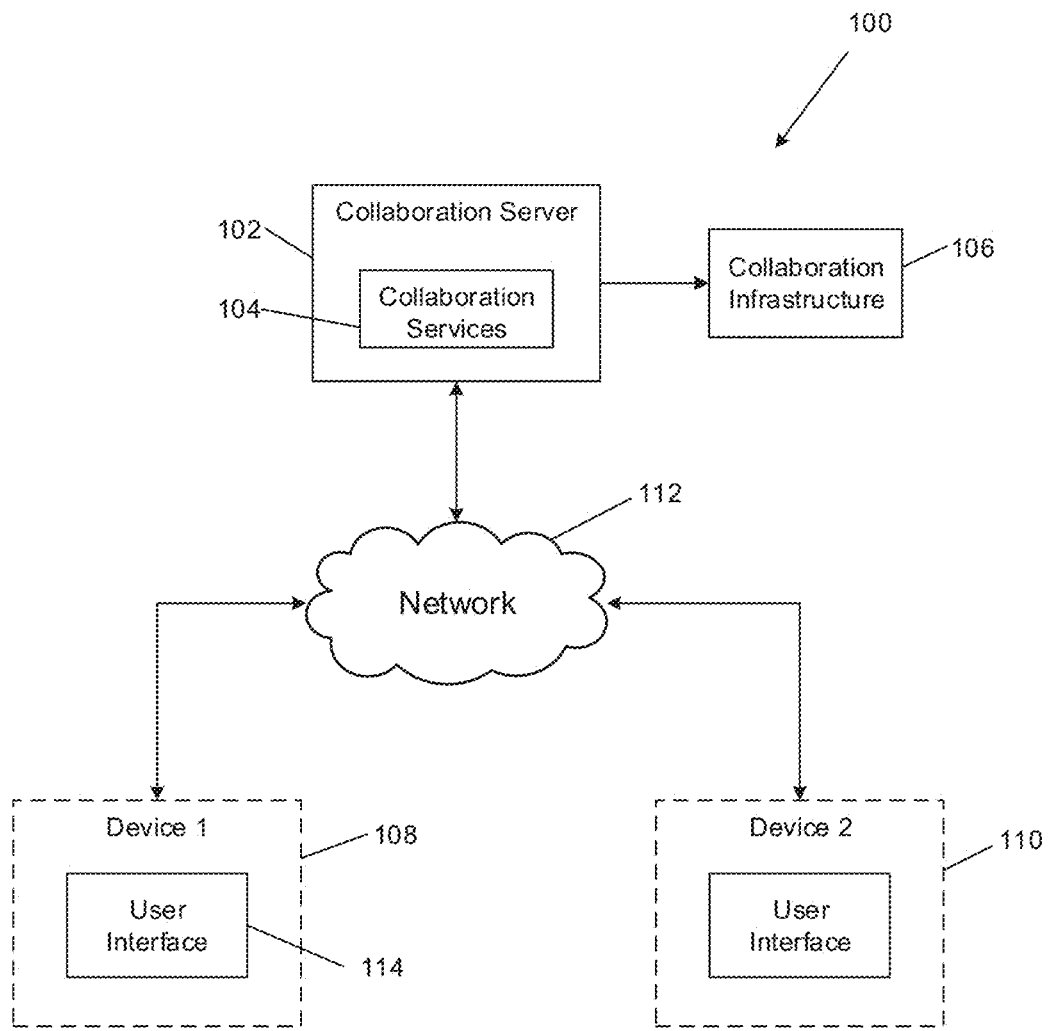
FIG. 1 illustrates an example medical diagnostic collaboration system.

The foregoing summary, as well as the following detailed description of certain examples of the present invention, will be better understood when read in conjunction with the attached drawings. For the purpose of illustrating the invention, certain examples are shown in the drawings. It should be understood, however, that the present invention is not limited to the arrangements and instrumentality shown in the attached drawings.

DETAILED DESCRIPTION

I. Overview

A. Introduction

Example methods, systems, and apparatus disclosed herein facilitate medical diagnostic collaboration between medical practitioners.

Although the following discloses example methods, systems, and apparatus including, among other components, software executed on hardware, it should be noted that such methods, systems, and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, and apparatus, the examples provided are not the only way to implement such methods, systems, and apparatus.

Also, although the methods, systems and apparatus disclosed herein are described in regards to healthcare applications, including, but not limited to, radiology information systems, it is to be understood that the present methods, systems and apparatus can also be used to distribute information in any other industry/application.

The medical diagnostic collaboration tools disclosed and described herein include: (1) messaging and presence; (2) screen share and video collaboration; (3) Smartlink; (4) real-time collaboration; and (5) interrupt workflow. Messaging and presence functionality is integrated into medical diagnostic tools to facilitate communication between clinicians within and across healthcare enterprises. Screen share and video collaboration enables collaboration between clinicians by transmitting video, such as a video capture of a user interface, to collaborating clinicians. Smartlink facilitates sharing discrete states of medical studies, as modified by a clinician, by creating and sharing bookmarks including meta-information that describes the current state of a study. Real-time collaboration synchronizes, in real-time or near real-time, medical studies shared between clinicians by automatically applying event actions and states performed on one device to all collaborating devices. Interrupt workflow facilitates seamless transitions between active studies and studies launched through collaboration tools.

The medical diagnostic collaboration tools disclosed herein virtually connect care teams on complex patient cases and help radiologists become care partners in the diagnosis and treatment of patients. Example use cases for the medical collaboration systems include collaboration between multiple radiologists for consultation to improve the quality of a diagnostic report; between radiologists and referring physicians for consultation regarding a diagnostic report or patient history; between multidisciplinary teams (MDTs), such as tumor review boards, for complex diagnoses; and between pathologists and clinical laboratory physicians, and referring physicians; among many other cases. The collaboration tools provide numerous benefits to healthcare enterprises, such as improved communication within and between healthcare enterprises, increased confidence in diagnostic findings, and improved access to sub-specialty reading, among others. Ultimately these advantages result in improved patient care and reduced cost.

B. Example Medical Diagnostic Collaboration System

FIG. 1 illustrates an example medical diagnostic collaboration system 100. The system 100 includes a collaboration server 102 that manages a suite of collaboration services 104, which leverage a collaboration infrastructure 106 to facilitate medical diagnostic collaboration between multiple devices, such as between a first device 108 and a second device 110, over a network 112. For the sake of brevity and clarity, only two devices are shown in system 100. However, the collaboration server 102 can facilitate collaboration between "N" (i.e., any number of) devices. Furthermore, the collaboration server 102 can manage "N" different collaboration sessions, each of which can be between "N" devices.

In an example, the system 100 facilitates medical diagnostic collaboration on a medical study, which can include one or more medical images of a patient anatomy, lab results, and/or other medical information. Medical images are acquired by one or more modalities, which can be any device capable of capturing an image of a patient anatomy. Example modalities include an x-ray system, computed tomography (CT) system, magnetic resonance (MR) system, ultrasound system, digital radiography (DR) system, positron emission tomography (PET) system, single photon emission computed tomography (SPECT) system, nuclear imaging system, and/or other modalities.

In an example, the first device 108 includes a user interface 114. The user interface 114 is a platform through which a medical practitioner can retrieve and view medical studies including medical images, such as Digital Imaging and Communications in Medicine (DICOM) images, for example. In certain examples, the user interface 114 includes various tools to facilitate image manipulation and annotation, workflow management, and reporting, among other things.

C. Example Collaborating Devices

Figure 2:
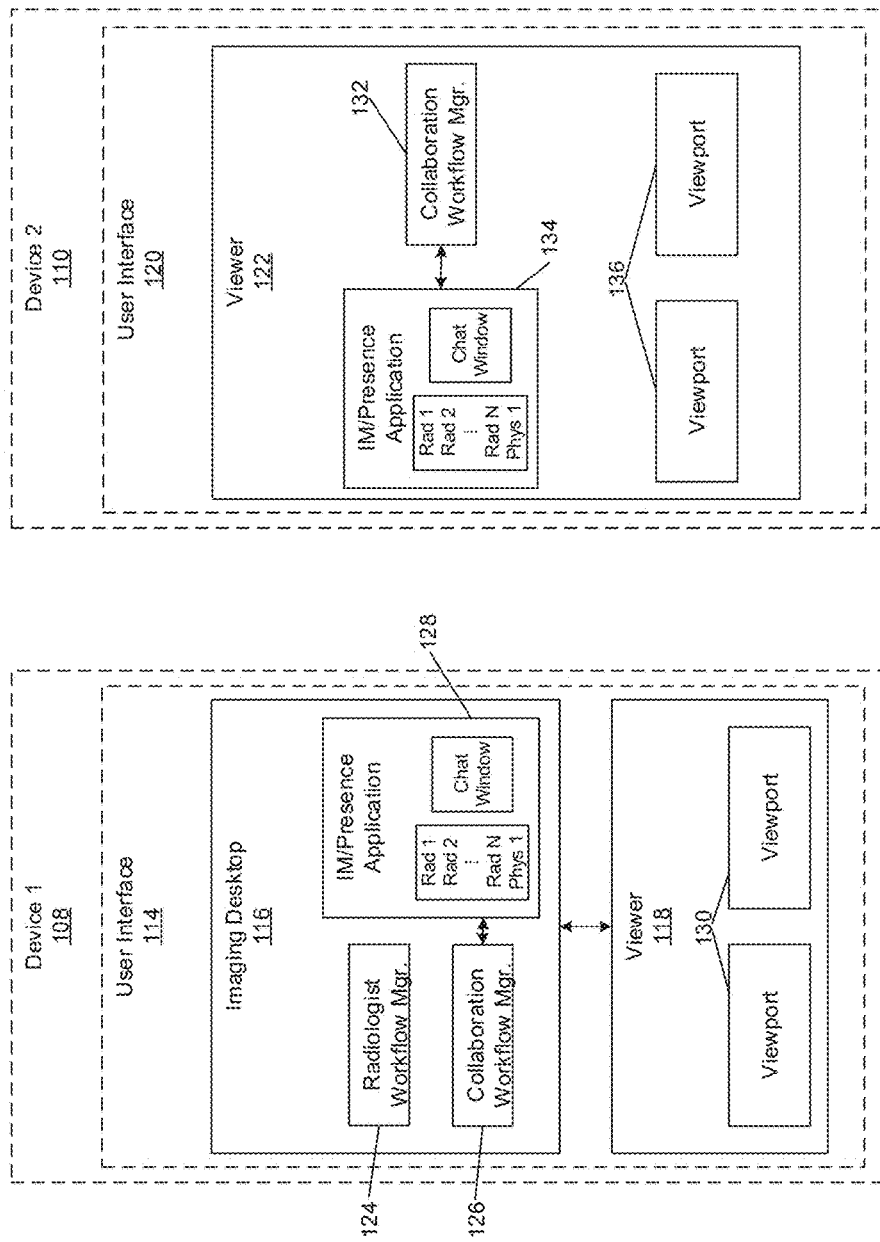
FIG. 2 illustrates example devices of a medical diagnostic collaboration system.

FIG. 2 illustrates an example of the first device 108 and the second device 110 of FIG. 1, wherein the first device 108 and the second device 110 utilize different user interfaces. User interfaces of the devices of the system 100 can include various tools and functionalities, depending on the intended user. For example, the first device 108 is an example of a device that can be used by a radiologist and the second device 110 is an example of a device that can be used by a referring physician. The user interface 114 of the first device 108 includes an imaging desktop 116 and a viewer 118, whereas the user interface 120 of the second device 110 includes an integrated thin client viewer 122. The medical diagnostic collaboration tools described herein (e.g., the collaboration system 100) facilitate collaboration with various devices. As described herein, the medical diagnostic collaboration tools facilitate collaboration between devices and systems developed and supported by a single vendor or by multiple vendors. The first device 108 and the second device 110 are merely illustrative of one example of the present system and are not intended to be limiting. Other examples of the present system facilitate collaboration between devices having different features and functionality than those described herein.

The imaging desktop 116 (e.g., GE HEALTHCARE CENTRICITY® RIS-i eRADCockpit) is a platform through which a radiologist can manage workflow, retrieve medical studies, create reports, and initiate collaboration events, among other things by utilizing a radiologist workflow manager 124, a collaboration workflow manager 126, and an IM/Presence application 128. The radiologist workflow manager 124 controls organization, prioritization, and selection of a radiologist's work. In certain examples, the radiologist workflow manager 124 includes intelligent workflow management features to automatically assign work based on availability, expertise, and resources, among other factors.

The collaboration workflow manager 126 includes tools through which a user of the first device 108 can initiate and carry out collaboration between other devices, such as with the second device 110. For example, the collaboration workflow manager 126 can include tools to facilitate instant messaging (IM) and presence through the IM/Presence application 128, as well as viewport sharing, screen sharing, collaboration workflow, and interrupt workflow, among others.

The viewer 118 of the first device 108 can display medical images, such as DICOM images, for example, on one or more viewports 130. The viewer 118 can be launched from the imaging desktop 116 or can be launched independently of the imaging desktop 116. Additionally, the viewer 118 is used to create and update annotations, create and process imaging models, and communicate within a system and/or across computer networks at distributed locations. The viewers of the system 100 can utilize various application programming interfaces (APIs). In an example, the viewer 118 is a universal viewer ("UVx," e.g., GE HEALTHCARE Universal Viewer for CENTRICITY® PACS and PACS-IW) that utilizes, for example, C++ and the Microsoft Foundation Class (MFC) library.

The second device 110 is an example a device that can be used by a referring physician. The user interface 120 of the second device 110 includes an integrated thin client viewer 122. The viewer 122 includes a collaboration workflow manager 132 and an IM/Presence application 134 to manage collaboration and instant messaging, and one or more viewports 136 for displaying medical images. In an example, the viewer 122 is a zero footprint ("ZFP," e.g., GE HEALTHCARE® Universal Viewer Zero Footprint Client) viewer that utilizes, for example, JavaScript (JS) with Hyper Text Markup Language 5 (HTML5). Zero footprint medical image viewers allow medical clinicians to display and manipulate medical images on a client device via a client browser without requiring particular configurations of the client device. Zero footprint and zero or silent deployment can be facilitated by server-side rendering of images. For example, image processing of advanced applications can occur on a server, rather than the client.

In certain examples, the medical collaboration system 100 facilitates collaboration between devices within a healthcare enterprise (i.e., intra-enterprise collaboration). An enterprise refers to a healthcare organization, such as a hospital, that utilizes a common network framework. In other examples, the medical collaboration system 100 facilitates collaboration between devices across different healthcare enterprises (i.e., inter-enterprise or cross-enterprise collaboration).

D. Collaboration Functional Services

Figure 3:
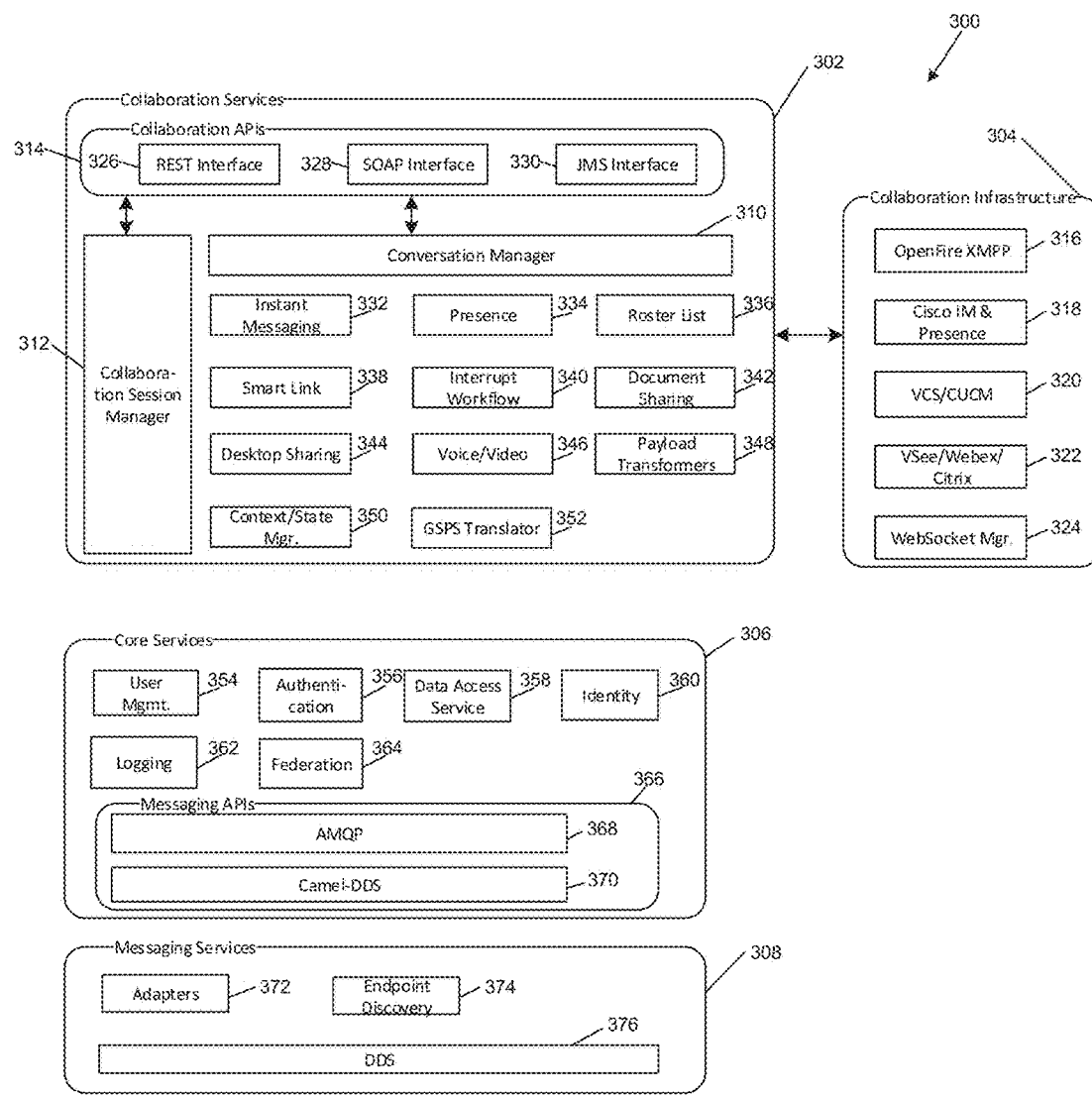
FIG. 3 illustrates functional services of a medical diagnostic collaboration system.

Turning to FIG. 3, functional services 300 of a medical diagnostic collaboration system (e.g., system 100 or other systems) are shown in a radiology context, and include collaboration services 302, collaboration infrastructure 304, core services 306, and messaging services 308. The functional services 300 described in connection with FIG. 3 can be utilized by the system 100 of FIG. 1, for example, or by other systems.

The collaboration services 302, which in certain examples are an implementation of the collaboration services 104, include a conversation manager 310, a collaboration session manager 312, and collaboration APIs 314. A conversation can span multiple collaboration sessions, each of which can leverage different systems within the collaboration infrastructure 304, which in certain examples is an implementation of the collaboration infrastructure 106.

The collaboration infrastructure 304 is a suite of tools that are leveraged to facilitate various forms of collaboration. In an example, the collaboration infrastructure 304 includes XMPP (e.g., OPENFIRE® XMPP) infrastructure 316 to facilitate instant messaging; CISCO® instant messaging (IM) and Presence 318 and/or CISCO® TelePresence Video Communication Server (VCS) and CISCO® Unified Communications Manager (CUCM) 320 to facilitate audio and/or video chat; VSEE®, WEBEX®, or CITRIX® 322 to facilitate screen sharing and/or video chat; and a WebSocket manager 324 to manage real-time collaborations. In other examples, alternative third-party and/or custom tools are utilized.

The conversation manager 310 manages active session threads and corresponding server processes and backing infrastructure for the various systems within the collaboration infrastructure 304 that are utilized by collaboration sessions within a conversation. The collaboration session manager 312 manages the initiation and lifecycle of each of the collaboration sessions within a conversation.

The conversation manager 310 and the collaboration session manager 312 utilize various collaboration APIs 314 to provide an interface for message negotiation and transmission. For example, the collaboration APIs 314 utilize a Representational State Transfer (REST) interface 326, a Simple Object Access Protocol (SOAP) interface 328, and/or a Java Messaging Service (JMS) interface 330.

The conversation manager 310 and the collaboration session manager 312 utilize various tools to facilitate conversations and collaboration sessions. Those tools include instant messaging 332, presence 334, roster list 336, Smartlink 338, interrupt workflow 340, document sharing 342, desktop sharing 344, voice/video 346, payload transformers 348, context/state manager 350, and/or a GSPS translator 352.

Instant messaging 332 and presence 334 allow clinicians to clinicians locate and discover other clinicians with whom they can engage in conversations and collaboration sessions within and across healthcare enterprises. The roster list 336 allows users to conveniently access contact lists to easily initiate collaboration sessions. In certain examples, collaboration sessions are initiated through instant messaging sessions. These tools are described in further detail below.

The conversation manager 310 and the collaboration session manager 312 utilize additional collaboration tools within instant messaging sessions, or independent of instant messaging sessions. The Smartlink tool 338 enables users to share a "snapshot" of a study, and is described in detail below. The interrupt workflow 340 operates in conjunction with a collaboration tool (e.g., the Smartlink tool 338) to manage active studies upon acceptance of a collaboration request (e.g., a Smartlink request), and is also described in further detail below.

The document sharing tool 342, the desktop sharing tool 344, and the voice/video tool 346 operate within an instant messaging session, or independent of an instant messaging session. These tools provide alternate collaboration mediums between users. The document sharing tool 342 allows users to share documents such as medical diagnostic reports or medical charts, for example. The desktop sharing tool 344 allows an initiating user to share his/her computer desktop with a receiving user, such that any content viewable on the computer desktop of the initiating user is also viewable on the computer desktop of the receiving user. In certain examples, the desktop sharing tool 344 allows an initiating user to pass control of his desktop to a receiving user. The voice/video tool 346 allows users to share audio and/or video therebetween, thereby facilitating teleconferencing or video conferencing capabilities.

The payload transformers 348 manage serializing information into a payload type (e.g., eXtensible Markup Language (XML) or JavaScript Object Notation (JSON)) for transmission to the collaboration server (e.g., the collaboration server 102), and de-serializing information received from the collaboration server (e.g., the collaboration server 102). These elements are described in further detail below.

The context/state manager 350 describes the current state of a viewer in several ways including, for example, viewport context information (e.g., study, series, and image information), hanging protocol, and presentation state, such as Grayscale Softcopy Presentation State (GSPS) information, among other things.

Viewport context information includes general information about a particular state of a viewer. A study identifier is a number or indicator of a particular study, which can include an image or series of images acquired by a modality. Study information further includes patient information and a workflow associated with the study. Series information describes a particular series of medical images within a study. Image information describes the particular image or images within a series that are presently displayed.

Hanging protocol is a set of display rules for presenting, formatting and otherwise organizing images on a viewer (e.g., the viewers 118, 122). A display rule is a convention for presenting one or more images in a particular temporal and/or spatial layout or sequence. For example, a hanging protocol can include a set of computer-readable instructions (or display rules, for example) that direct a computer to display a plurality of images in certain locations on a viewer and/or display the plurality of images in a certain sequence or order. In another example, a hanging protocol can include a set of computer-readable instructions that direct a computer to place a plurality of images in multiple screens and/or viewports on a viewer. In general, a hanging protocol can be employed to present a plurality of images for a diagnostic examination of a patient anatomy featured in the images.

A presentation state, such as a GSPS, is an independent DICOM service-object pair (SOP) Instance that includes information regarding how a particular image is to be displayed. For example, a presentation state can include label information (e.g., label type, position, etc.), windowing value, zoom value, scrolling (e.g., panning) value, rotation, and/or other visual display element defined within the DICOM standard. A presentation state can be applied to an image so that the image is displayed with the visual specifications defined by the presentation state. Using a presentation state, an image can be displayed in a certain way but is not modified, thereby allowing a program or other user to revert back to the original image, if desired. The GSPS translator 352 receives data describing GSPS, and translates that data for presentation on a viewer (e.g., the viewers 118, 122).

Core services 306 are tools that facilitate the underlying functionality of the devices, such as the workspaces and viewers, and the underlying collaboration services and provider infrastructure. Core services 306 include services for user management 354, authentication 356, data access service 358, identity 360, logging 362, and federation 364.

User management 354, authentication 356, data access service 358, and identity 360 tools manage individual user (e.g., radiologist and/or clinician) identities, their authentication, authorization, roles, and privileges within or across system and enterprise boundaries. These tools enhance system security with respect to access controls and authorization privileges to ensure patient safety and confidentiality. In certain examples, users (e.g., radiologists and clinicians) can have established identities across various service providers that comprise a collaboration infrastructure. For example, each of the users can have an enterprise identity, which is typically used to login to users' individual workspaces or imaging desktops, along with a collaboration-specific identity stored in a database (e.g., a default XMPP provider, such as OPENFIRE®, database). In addition, each of the users can have a different identity in a third-party communication database (e.g., CISCO® Unified Communication Manager DB). In such cases, the core services 306 manage users' principal identity 360 information and provide user authentication and authorization to other service providers within a federation. In an example, this is accomplished by a combination of WS-Trust security tokens and a Security Assertion Markup Language (SAML)-based single sign-on (SSO) mechanism for communicating user authentication, entitlement and attribute information.

User management 354 includes a software development kit (SDK) to add users and a user provisioning tool to manage information about users. Authentication 356 ensures that only authorized users can access the system and the respective collaboration services. In an example, each clinician has an associated username and password. In an example, usernames and passwords are established and stored in an enterprise Lightweight Directory Access Protocol (LDAP) or database based on an identity store. Upon launching the user interface (e.g., the user interfaces 114, 120), clinicians are prompted to login by inputting their username and password, which is compared to a database to determine if the clinician is certified to access the user interface and the respective collaboration services contained therein. In an example, upon authentication against the principal identity store, a SAML-based access token is created and returned which is then used to grant single sign-on access for the principal to the various collaboration services and underlying infrastructure. In addition, a declarative access control, eXtensible Access Control Markup Language-based (XACML-based) policy implementation can be used to evaluate and authorize access requests. Furthermore, data access service 358 is a handle to the contextually abstracted data model for the respective collaboration services. Identity 360 manages patient identity and ensures that studies and diagnostic reports are associated with the proper patient.

Logging 362 maintains an audit record including a list of collaboration sessions, collaboration participants, and specific actions performed on a device, for later retrieval. Federation 364 enables remote users (e.g., cross-enterprise, e.g., single sign-on users) to use the system.

Messaging APIs 366 include AMQP 368 and Camel-DDS 370. AMQP 368 stands for the Advanced Message Queuing Protocol. AMQP is an open standard application layer protocol for message-oriented middleware. The defining features of AMQP are message orientation, queuing, routing (including point-to-point and publish-and-subscribe), reliability and security. Furthermore, AMQP enables interoperability between different systems, such as cross-enterprise interoperability.

APACHE® Camel is an open-source integration framework and consists at the core a powerful routing/mediation engine. Camel enables the use of Enterprise Integration Patterns (EIPs) to implement integration solutions utilizing mediation and routing rules with Java or XML-based Domain Specific Language (DSL) constructs. Camel provides an extensible model to create components that function as protocol-level connectors and provide a uniform endpoint interface for use with the DSL constructs. Camel-DDS 370 refers to the DDS component of Camel that acts as a connector to the Object Management Group's Data Distribution Service (OMG DDS) protocol standard implementation. Camel-DDS 370 allows an integration solution to be built atop the core Camel engine to leverage DDS's performance, scalability, Quality of Service (QoS), and discovery features, which are discussed in further detail below. DDS is a middleware standard to facilitate data exchanges between publishers and subscribers. Camel-DDS 370 takes advantage of Camel's ability to mediate across different middleware technologies as well as its transformation engine.

Messaging services 308 include adapters 372, endpoint discovery 374, and DDS 376. Message adapters 372 allow sending and receiving of discrete units of information, typically identified by a unique name. Endpoint discovery 374 facilitates dynamic, automatic discovery of messaging publishers and subscribers.

Adapters 372 and endpoint discovery 374 work with DDS 376. DDS is a data communications standard that describes low-latency data communications for distributed applications. The DDS standard includes support for type-safe application defined data types; dynamic discovery of publishers, subscribers, and topics; rich quality of service policy configuration; and on-the-wire interoperability. DDS implementations provide high-performance data communications, which are suitable for real-time and near real-time systems. Several commercial and open source implementations of the DDS standard are available for use. The DDS standard contains an easy-to-use, well-defined API, which allows developers to write portable code that will work with any compliant DDS implementation. The DDS standard references the Real Time Publish Subscribe (RTPS) wire protocol standard, which defines the wire protocol for DDS communications. In general, DDS is a peer-to-peer communication model requiring no gateways, servers, or daemons that must be run or configured.

II. Messaging and Presence

Messaging and presence functionality allows clinicians to engage in conversations within and across healthcare enterprises. Messaging and presence includes the instant messaging tool 332, the presence tool 334, and the roster list tool 336.

The instant messaging tool 332 is a type of online chat tool that offers text transmission over a network, such as over a local area network (LAN) or over the Internet. Short messages are typically transmitted bi-directionally between two or more parties, when each user chooses to complete a thought and select "send." Additionally or alternatively, the instant messaging tool 332 uses push technology to provide real-time text, which transmits messages character by character, as they are composed. The instant messaging tool 332 can also facilitate file transfer, clickable hyperlinks, Voice over Internet Protocol (VoIP), and/or video chat.

In an example, the instant messaging tool 332 facilitates instant messaging via a collaboration server (e.g., the collaboration server 102), leveraging a communications protocol, such as Extensible Messaging and Presence Protocol (XMPP). XMPP is a communications protocol for Message-oriented Middleware (MOM) based on XML. In other examples, alternate or custom communications protocols are utilized.

In operation, for example, the instant messaging tool 332 facilitates message transfer via an application on the first device 108 or the second device 110, such as the IM/Presence application 128 (FIG. 2). In an example, the first device 108 and the second device 110 operate on servers in different domains. The collaboration server 102 facilitates collaboration between cross-domain servers, such as between the first device 108 and the second device 110, by federating messaging (e.g., XMPP) traffic therebetween.

The instant messaging tool 332 works in conjunction with the presence tool 334 and the roster list tool 336. The presence tool 334 manages the presence of users in the system (e.g., the systems 100 or other systems). Presence is a status indicator that conveys ability and willingness of a potential communication partner (e.g., a user of the first or second devices 108, 110) to communicate. The presence tool 334 provides presence information (e.g., presence state) via a network connection to the collaboration server (e.g., the collaboration server 102), which is stored in a personal availability record and is made available for distribution to other users to convey availability for communication.

The presence tool 334 indicates user presence by displaying an indicator icon next to the user on the instant messaging tool 332, typically from a choice of graphic symbols with easy-to-convey meanings (e.g., green, yellow or red circles), and/or a list of corresponding text descriptions of each of the states. Common states of the user's availability are "available," "busy," "inactive," "away," "do not disturb," "in a call," etc.

In certain examples, users can have established identities across various messaging (e.g., XMPP) service providers (e.g., CISCO® IM & Presence, MICROSOFT LYNC®, GOOGLE TALK®, etc.). In these examples, implementation of messaging protocols (e.g., XMPP) by the presence tool 334 facilitates presence by broadcasting a user presence of users in an enterprise, and/or broadcasting a federated user presence of users in a cross-domain (e.g., multi-site) enterprise.

The roster list tool 336 manages one or more contact lists of each user in a system (e.g., the system 100). In an example, the roster list tool 336 allows users to search by various fields, such as name, location, hospital, specialty, presence, and fees, among other fields. In certain examples, the roster list tool 336 facilitates a federated cross-domain search of all users in an enterprise. For example, a collaborating radiologist can execute a search to provide a consolidated list of all users (e.g., fellow radiologists and/or specialists, referring physicians, subject matter experts, etc.) in an enterprise, which can have multiple sites. In addition, contact lists can be pre-populated according to organizations and/or specialty areas, or can be customizable for each user such that a user can add or remove contacts, including cross-domain users.

In certain examples, the roster list tool 336 can intelligently pre-populate contact lists depending on particular studies that are loaded. For example, an active study might involve consultation with a sub-specialist with experience in a particular specialty area. The roster list tool 336 could, for example, populate the contact list with all sub-specialists that have experience in the particular specialty area involved in the study. In certain examples, the roster list tool 336 prioritizes the order of contacts based on availability, preferred contact status or other characteristics. These features are particularly useful for teleradiology (e.g., remote radiology services), among other things. For example, the roster list tool 336 can pre-populate contact lists with preferred teleradiologists and can prioritize their order based on availability, cost, etc. Furthermore, the roster list tool 336 supports searching contacts by various fields, such as location, healthcare organization, credentials, certifications, education, resources, cost, availability, among other fields.

In certain examples, the roster list tool 336 also facilitates the discovery of clinicians (e.g., radiologists) based on the above-mentioned fields (e.g., location, healthcare organization, credentials, certifications, education, resources, cost, availability, among other fields). In effect, the roster list tool 336 provides a "virtual marketplace" for collaborating clinicians (e.g., radiologists). The roster list tool 336 can further support ratings and comments for its users (e.g., radiologists), so that users can develop their reputation and goodwill within the system, which also provides an indication of the quality of work that certain users tend to provide. In certain examples, a healthcare organization can pre-approve certain users, with whom a clinician (e.g., a radiologist) can collaborate.

Figure 4:
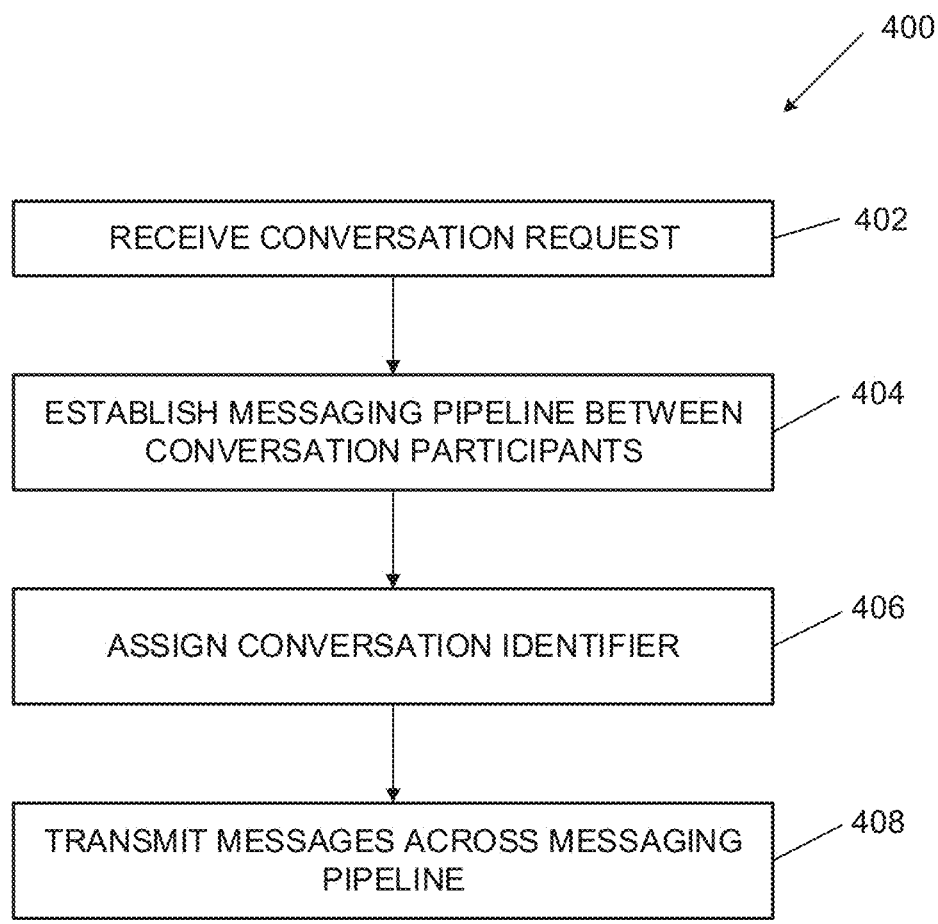
FIG. 4 illustrates a flow diagram of an example method of conducting a conversation utilizing an instant messaging tool.

FIG. 4 illustrates a flow diagram of an example method 400 of conducting a conversation utilizing the instant messaging tool 332. In operation, for example, a user can initiate a conversation (via, e.g., the IM/Presence application 128 (FIG. 2)) with one or more users in his/her contact list, which is managed by the roster list tool 336. The user can choose the users with whom he/she wishes to initiate a conversation based on the users' presence, as managed by the presence tool 334.

At 402, the instant messaging tool 332 receives a conversation request from a first user to initiate a conversation with a second user.

At 404, the instant messaging tool 332 establishes a messaging pipeline (e.g., an XMPP pipeline) between the first and second users.

At 406, the instant messaging tool 332 assigns a conversation identifier to the conversation between the first and second users. The conversation identifier is maintained throughout the conversation.

At 408, the instant messaging tool 332 transmits, over the messaging pipeline (e.g., XMPP Pipeline), messages sent by the first or second users. The instant messaging tool 332, the presence tool 334, and the roster list tool 336 leverage the collaboration infrastructure 304 via a collaboration server (e.g., the collaboration server 102) to facilitate seamless communications.

III. Screen Share and Video Collaboration

Screen share and video collaboration provide alternate mediums to facilitate medical collaboration between users. In certain examples, WebRTC (Web Real-Time Communication), CISCO WEBEX® collaboration infrastructure, CITRIX® ICA Web Client, VSEE®, or other peer-to-peer tools can be used to facilitate medical collaboration.

In certain examples, WebRTC is used to capture and transfer remote desktop screen streaming data in real-time or near real-time. WebRTC is an open framework for the web to enable browser-to-browser applications for voice calling, video chat, and peer-to-peer (P2P) file sharing without plugins. WebRTC was built atop pioneering work done by GOOGLE® in GMAIL® Video Chat. The initial work by Google has been followed by ongoing work to standardize the relevant protocols in the Internet Engineering Task Force (IETF) and browser APIs in the World Wide Web Consortium (W3C).

To acquire and communicate streaming media, such as from multiple user desktops, WebRTC implements (1) MediaStream to provide access to data streams, such as a user's desktop screen captured as a video input stream; (2) RTCPeerConnection to facilitate video calling between multiple client peers, with facilities for encryption and bandwidth management; and (3) RTCDataChannel to facilitate peer-to-peer communication of streaming data between browsers (e.g., peers).

Figure 5:
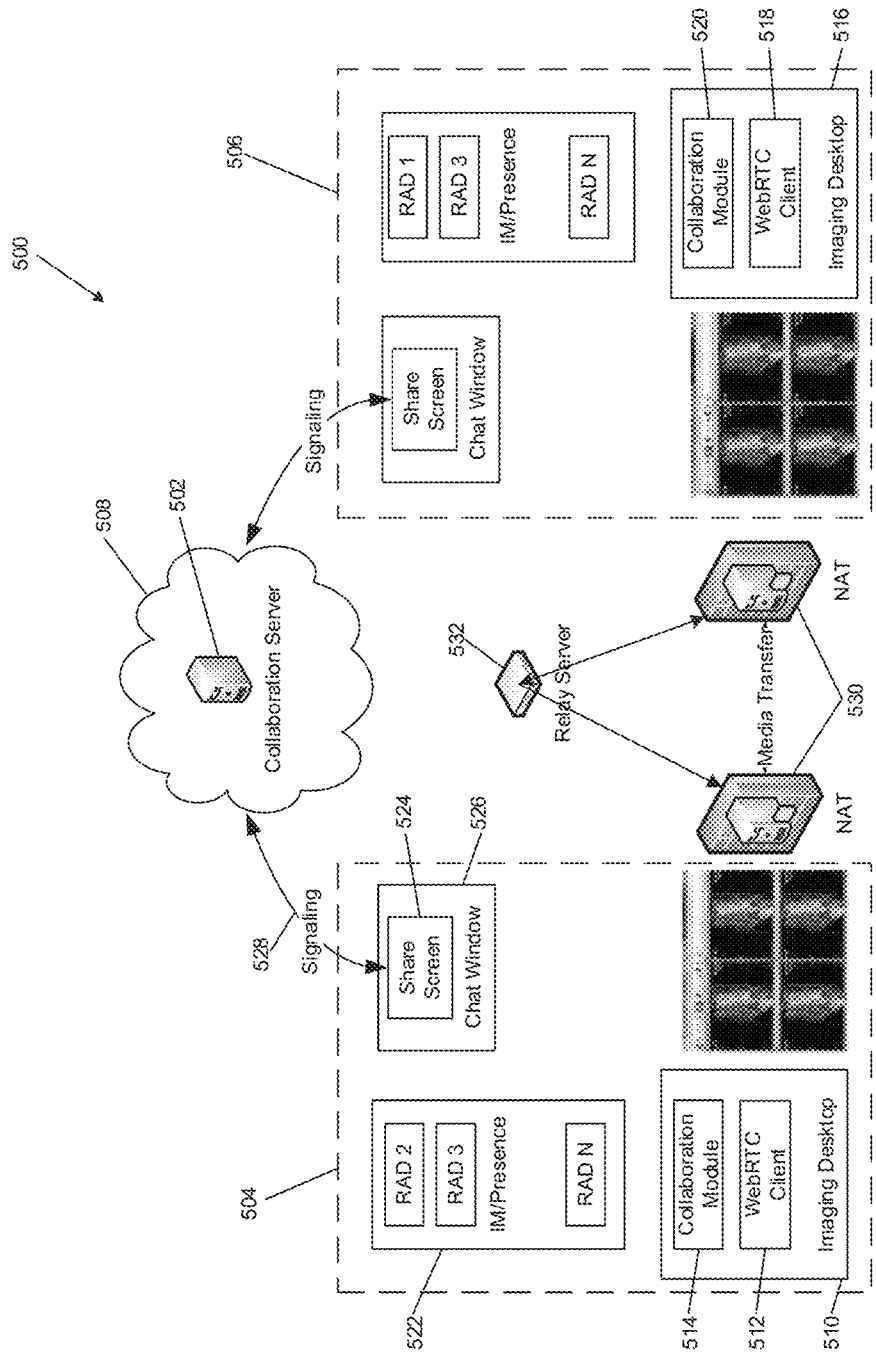
FIG. 5 illustrates an example medical diagnostic collaboration system.

FIG. 5 illustrates an example collaboration system 500. The collaboration system 500 includes a collaboration server 502 to facilitate medical diagnostic collaboration between multiple devices, such as between a first device 504 and a second device 506 over a network 508. The first device 504 includes a first imaging desktop 510, a first WebRTC client 512, and a first collaboration module 514. Similarly, the second device 506 includes a second imaging desktop 516, a second WebRTC client 518, and a second collaboration module 520.

In operation, the first WebRTC client 512 of the first device 504 captures a media stream, such as a desktop screen captured as a video InputStream, for example. In an example, the first and second WebRTC clients 512, 518 are implemented as JavaScript libraries utilizing a WebRTC browser implementation and integrated within the first and second collaboration module 514, 520 (which in other examples are implemented as the collaboration workflow managers 126, 132 of FIG. 2) of the first and second devices 504, 506, respectively. In an example, the first and second WebRTC clients 512, 518 include plugins to be installed on the collaborating devices (e.g., the first and second devices 504, 506).

In an example, a collaboration session is initiated between the first device 504 and the second device 506 by establishing a conversation through the IM/Presence application 522 of the first device 504. Desktop screen sharing is initiated by clicking a "Share Screen" button 524 within a chat window 526. A signaling channel 528 is established between the first device 504 and the second device 506 via the collaboration server 502 and the desktop screen of the first device 504 is shared with the second device 506.

Signaling, over the signaling channel 528 via the collaboration server 502, is used to coordinate communication and send control messages, and also to exchange network information such as IP addresses and ports between the collaborating WebRTC peer clients (e.g., the first device 504 and the second device 506, to transfer public keys/certificates, and/or to initiate or close sessions, among other things. In addition, the signaling channel 528 enables the exchange of peer information about media and client capability, such as resolution and codecs. Furthermore, signaling communicates the streaming of desktop screen-capture data by maintaining a steady peer-to-peer media stream connection, which allows the traversal of Network Address Translation (NAT) and firewalls 530.

Figure 6:
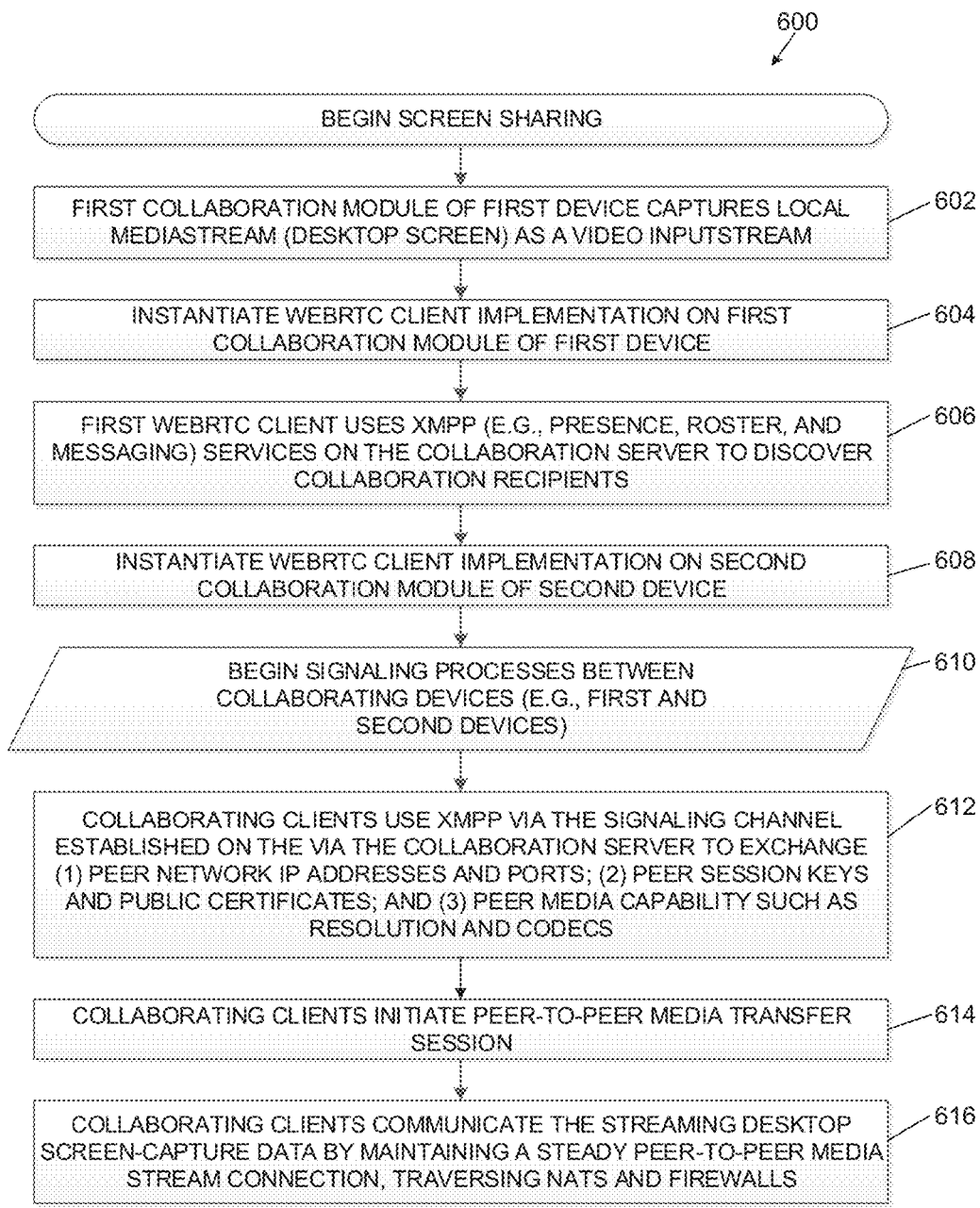
FIG. 6 illustrates a flow diagram of an example method of facilitating medical diagnostic collaboration between devices via a collaboration server.

FIG. 6 illustrates a flow diagram of an example method 400 of facilitating medical diagnostic collaboration between the first device 504 and the second device 506 via the collaboration server 502.

At 602, the first collaboration module 514 of the first imaging desktop 510 of the first device 504 captures a local MediaStream (e.g., desktop screen) as a video InputStream.

At 604, the first collaboration module 514 of the first device 404 instantiates an implementation of the first WebRTC client 512.

At 606, the first WebRTC client 512 uses messaging services (e.g., XMPP services such as presence, roster, and messaging) via the collaboration server 502 to discover other users and initiate conversations. User authentication, user lookup and logging are performed through these and other services.

At 608, a messaging session (e.g., a conversation) is established between the first device 504 and the second device 506 and the second device 506 instantiates an implementation of the second WebRTC client 518.

At 610, the collaboration server 502 a signaling channel 528 is established between the first device 504 and the second device 506 via the collaboration server 502 to facilitate signaling process therebetween.

At 612, the collaborating clients (e.g., the first device 504 and the second device 506) utilize a messaging protocol (e.g., XMPP) via the signaling channel 528 established via the collaboration server 502 to exchange (1) peer network IP addresses and ports; (2) peer session keys and public certificates; and (3) peer media capability such as resolution and codecs. Using the XMPP infrastructure on the collaboration server 502 enables multiple collaborating peers to establish a channel for exchanging network information, codecs, media format information and client public keys/certificates, among other things. In an example, a WebSocket manager on the collaboration server 502 could be used instead.

At 614, the collaborating clients (e.g., the first device 504 and the second device 506) initiate a peer-to-peer media transfer session over the signaling channel 528 established via the collaboration server 502. Thus, the first device 504 can share its desktop screen with the second device 506.

At 616, the collaborating clients (e.g., the first device 504 and the second device 506) communicate the streaming desktop screen-capture data by maintaining a steady peer-to-peer media stream connection, thereby traversing NAT and firewalls 530.

In an example, an Interactive Connectivity Establishment (ICE) framework utilizes Session Traversal Utilities for NAT (STUN) and Traversal Using Relay NAT (TURN) protocols to enable RTCPeerConnection with NAT traversal. ICE is a framework for connecting peers such as two desktop share collaboration clients (e.g., the first device 504 and the second device 506). WebRTC client implementation enables each client to send media directly to the clients taking part in the screen sharing collaborative call. This mechanism has the distinct advantage that media is not sent through a central server (e.g., the collaboration server 502), thereby avoiding latency and performance bottlenecks. In the event that client nodes cannot send User Diagram Protocol (UDP) packets to each other, the UDP packets are sent using an automatic fallback mechanism and media flow is routed through a relay server 532. WebRTC shields web developers from myriad complexities that lurk beneath peer-to-peer media transfers. The codecs and protocols used by WebRTC perform a significant amount of work to make real-time communication possible, even over unreliable networks, by using features such as packet loss concealment, echo cancellation, bandwidth adaptivity, dynamic jitter buffering, automatic gain control, noise reduction and suppression, and/or image "cleaning," among others.

In certain examples, all network input/output (I/O) traffic originating from a peer WebRTC client is encrypted. The encryption layer encrypts all traffic using standards such as the Advanced Encryption Standard (AES), for example. A session key is generated for each client-to-client connection. It is assumed that the signaling process between the various participating peers happens over an encrypted WebSocket/XMPP pipeline, which performs the exchange of public keys between each client. The client-generated sessions keys are between client nodes using RSA public/private key encryption.

Certain examples facilitate desktop/application sharing to allow collaborating users to share one or more application windows or the entire computer desktop. In an example, desktop/application sharing is facilitated using the VSEE® infrastructure. VSEE® is a proprietary low-bandwidth, group video chat and screen-sharing software tool. The VSEE® client is available as WINDOWS® and IOS® applications, which must be downloaded and installed on each collaboration device. The VSEE® client exposes all user-facing features such as audio, video, desktop sharing, file transfer, presence, IM/chat, and camera control, among others. In an example VSEE® implementation, a WINDOWS® directory server handles user authentication, encryption key exchange, user lookup, capability control, call setup, and logging, among other features. In an example, an alternate relay server is available as a Multipoint Control Unit (MCU) box, part of the VSEE® infrastructure, which can be utilized by WINDOWS® to handle firewall traversals through UDP and HTTP(S) if peer-to-peer links between client nodes are not possible. A networking and encryption layer is common across the directory server, relay server and client, and handles transmission of messages (which can be 256 bit AES encrypted, for example) between end points. VSEE® provides one-click application and desktop sharing, remote control, and live graphical and text annotation. It provides a lossy mode for normal usage along with a lossless mode for special applications demanding highest image quality (e.g., via an imaging desktop such as GE HEALTHCARE Universal Viewer for CENTRICITY® PACS and PACS-IW).

IV. Smartlink

A. Introduction to Smartlink

A "Smartlink" facilitates sharing a "snapshot" of a current state of a viewport of a first user with a second user. This is accomplished by creating a bookmark describing the current state of a viewport of the first user in connection with a procedure or study identifier, and sending the bookmark to the second user as a Smartlink request. Acceptance of the Smartlink request by the second user launches a viewer and injects the bookmark to load the shared study. If the second user has a study open when he receives a Smartlink request, an interrupt workflow tool automatically saves the active study into a work queue before injecting the bookmark to load the shared study.

To describe the current state of a viewer, a bookmark can include, for example, a procedure identifier (e.g., a RIS-i procedure identifier), a study identifier, viewport context information (e.g., study, series, and image information), hanging protocol, and Grayscale Softcopy Presentation State (GSPS) information, among other things.

Figure 7:
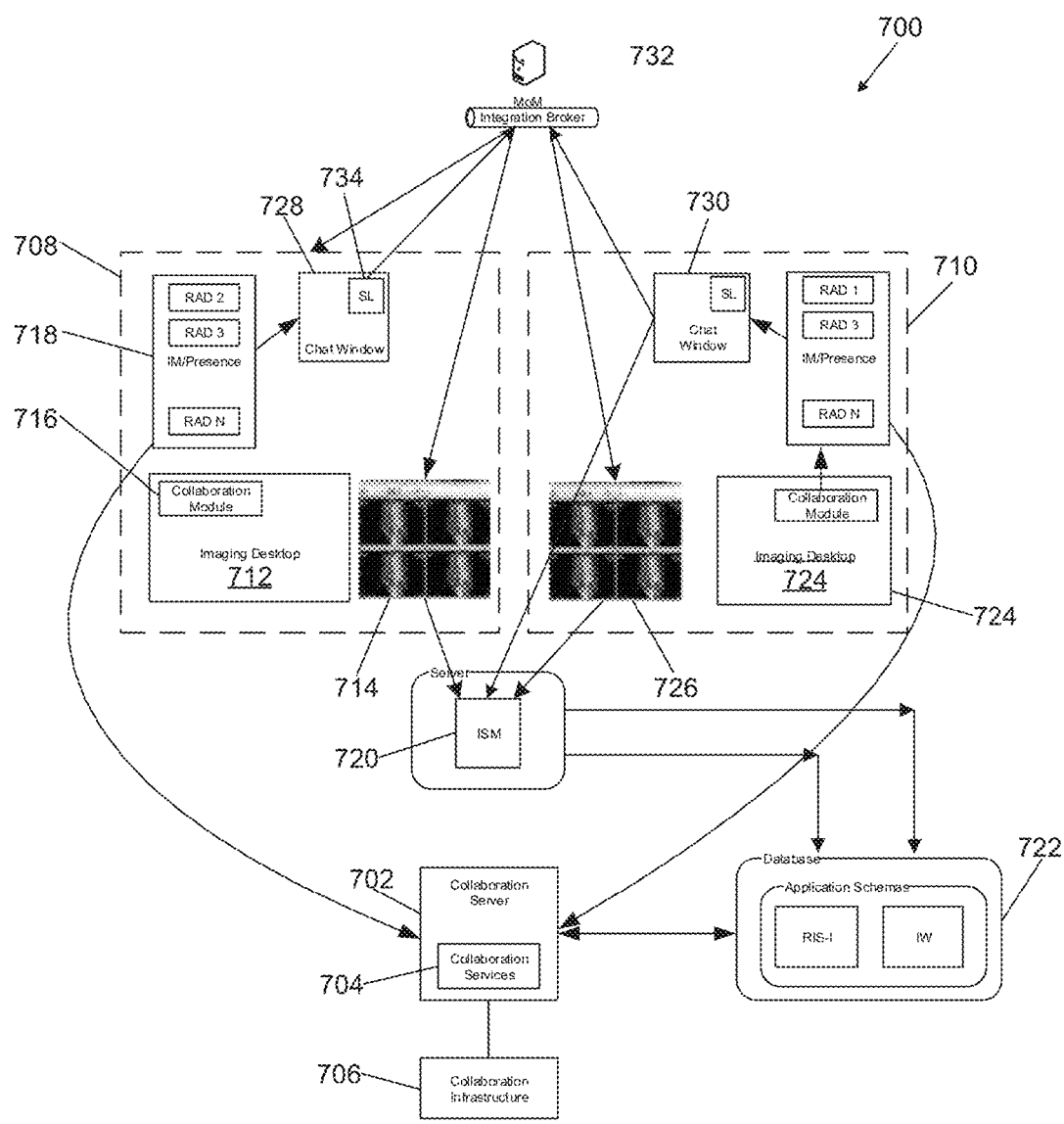
FIG. 7 illustrates an example medical diagnostic collaboration system.

FIG. 7 illustrates an example collaboration system 700. The collaboration system 700 is an example implementation of the systems of FIGS. 1, 2 and 5, for example, and can utilize the collaboration functional services of FIG. 3, for example.

The collaboration system 700 includes a collaboration server 702 that manages a suite of collaboration services 704, which leverage a collaboration infrastructure 706 to facilitate medical diagnostic collaboration between multiple devices, such as between a first device 708 and a second device 710.

The first device 708 includes a user interface including an imaging desktop 712 and a viewer 714. The imaging desktop 712 is utilized by a radiologist to organize, prioritize, and select work. The imaging desktop 712 includes task-specific modules such as reporting (including patient exam history, order information, clinical information, embedded reporting with voice recording, etc.), multi-disciplinary care team (MDT) collaboration, vetting, and protocolling. In addition, the imaging desktop 712 includes a collaboration module 716, which manages an IM/Presence manager 718, among other things.

In an example, the first device 708 requests a study from an imaging services manager 720, which retrieves the study from a database 722 and passes the study to the first device 708. In an example, the database 722 is an enterprise archive (EA). In another example, the database 722 includes a RIS, a PACS, or an integrated RIS/PACS system. Study information, such as patient data and exam data is loaded into the imaging desktop 712 and images associated with the study are loaded into the viewer 714.

Similarly, in an example, the second device 710 has a user interface including an imaging desktop 724 and a viewer 726. In another example, the second device 710 has a user interface including an integrated viewer, such as a ZFP viewer.

In an example, a conversation can be initiated by the first device 708 via its IM/Presence application 718. The IM/Presence application 718 includes a roster list, which includes presence for each of the contacts within the roster list. The user of the first device 708 initiates a conversation with the user of the second device 710 by double clicking the name of the user of the second device 710 within the roster list, for example. Upon initiating the conversation, a chat window 728 opens on the first device 708 and a corresponding chat window 730 opens on the second device 710. A messaging pipeline, such as an XMPP pipeline, is established between the first and second devices 708, 710, and a conversation identifier is assigned to the conversation. The users of the first and second devices 708, 710 can engage in conversation over the messaging pipeline by typing in their respective chat windows 728, 730. Messages are exchanged, for example, by passing XML-based content over the established messaging pipeline (e.g., XMPP pipeline). Cryptographic protocols such as Secure Sockets Layer (SSL) can be used to encrypt data communicated between the first and second devices 708, 710.

In certain examples, communication between the first device 708 and the second device 710 is facilitated through an integration broker 732, which can utilize Message Oriented Middleware (MOM), for example. MOM allows application modules to be distributed over heterogeneous (e.g., cross-enterprise) platforms. The integration broker 732 supports sending and receiving messages between distributed systems. In certain examples, the integration broker 732 is integrated into the collaboration server 702. In other examples, communication is facilitated using a "bus" based component.

Figure 8:
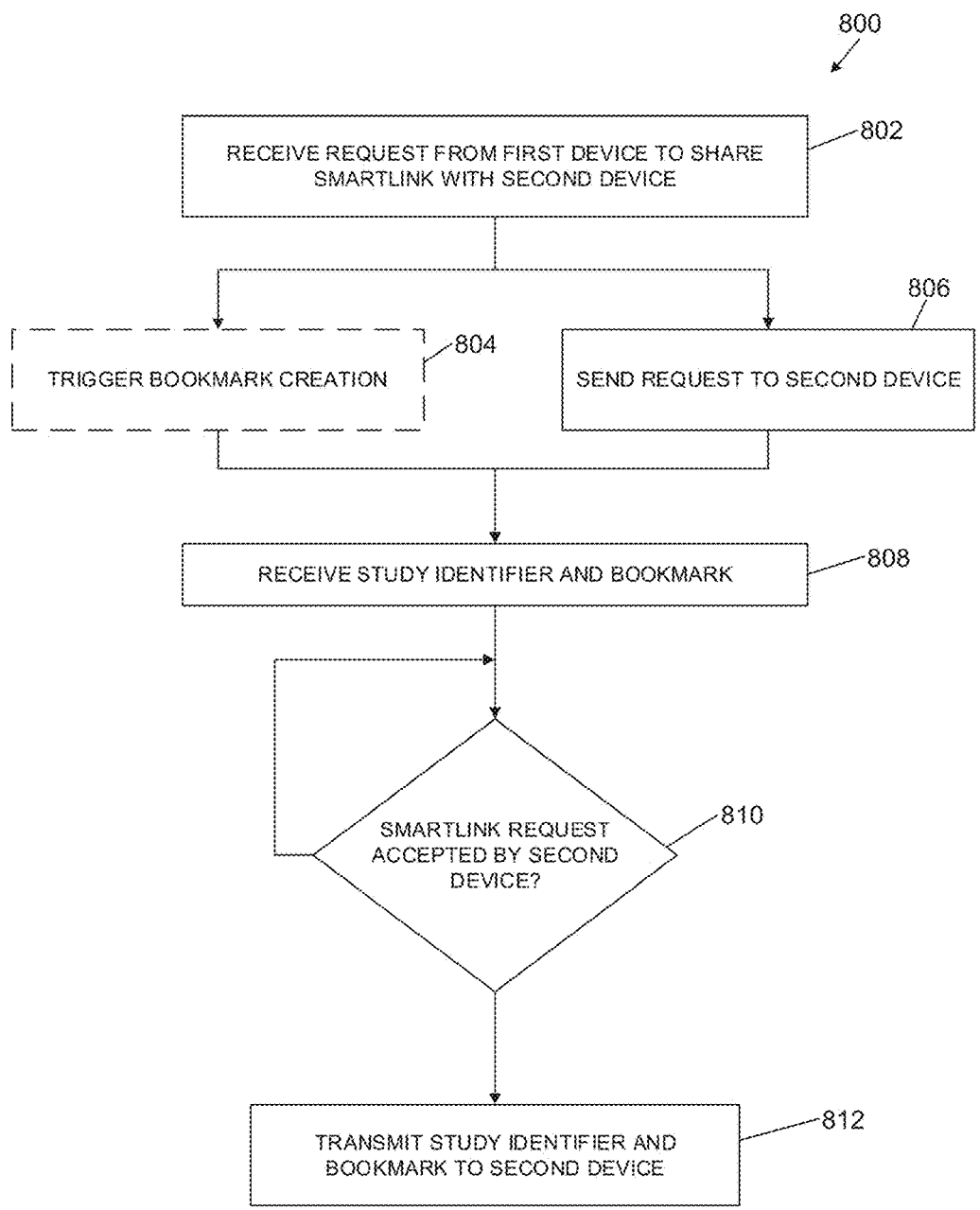
FIG. 8 illustrates a flow diagram of an example method of medical diagnostic collaboration performed by a collaboration server including sharing a discrete state of a medical study.

FIG. 8 illustrates a flow diagram of an example method 800 of initiating a Smartlink, as performed by the collaboration server 702. In operation, a Smartlink is initiated by clicking a Smartlink icon 734 in the chat window 728.

At 802, the collaboration server 702 receives a request from the first device 708 to share a Smartlink with the second device 710.

At 804, the first viewer 714 silently creates a bookmark encompassing a current state of the first viewer 714 (e.g., including viewport context, GSPS state and/or viewport hanging protocol). In an example, the first viewer 714 includes a native function for bookmark creation.

At 806, in parallel with 704, the collaboration server 702 sends a Smartlink request to the second device 710. An indicator is displayed on the second device 710 that it has received a Smartlink, which it can either accept or reject.

At 808, the collaboration server 702 receives a procedure or study identifier of the study, and the bookmark from the first device 708.

At 810, the collaboration server 702 receives an indication from the second device 710 that it accepted the Smartlink.

At 812, the bookmark and the procedure or study identifier are sent to the second device 710. The imaging desktop 724 of the second device 710 launches the viewer 726 and injects the bookmark, thereby loading the study on the viewer 726.

The bookmark can be sent from the first device 708 to the second device 710 in various ways. In an example, the viewer 714 sends the bookmark back to the imaging desktop 712 of the first device 708. The imaging desktop 712 sends the bookmark and the study and/or procedure identifier to the second device 710 over the established messaging pipeline. In an example, the bookmark is sent as raw data over a messaging protocol (e.g., XMPP).

In an example, the viewer 714 assigns the bookmark a bookmark identifier and saves the bookmark to the imaging services manager 720 or to an external database 722. The viewer 714 passes the bookmark identifier to the imaging desktop 712 of the first device 708, which relays the bookmark identifier to the second device 710 over the established messaging pipeline. The second device 710 can retrieve the bookmark identifier and the associated study from the imaging services manager 720 or external database 722, and load the study on its viewer 726.

As mentioned above, a MOM broker interface is utilized in certain examples to exchange XML-based content. In operation, for example, upon clicking the Smartlink icon 734, a message is sent from the imaging desktop 712 to the viewer 714 via the MOM broker interface 732 working in a publish/subscribe manner to pass an XML payload comprising a set of parameters and a remote command. More specifically, the imaging desktop 712 publishes an XML-based command message for viewer bookmark creation to a MOM interface integration "Topic." The MOM integration broker 732 brokers the message onto the "Subscriber" for that "Topic," and the "Handler," which in this example would invoke a native viewer function for bookmark creation.

In an example, a "bus" based component is used instead of the MOM broker interface 732. In both examples, the viewer 714 receives a command to create a bookmark (e.g., createBookmark( )) via invocation of a native viewer function to create a bookmark, which returns with a created bookmark and bookmark identifier. The created bookmark can be saved in the imaging services manager 720.

In an example, the created bookmark is sent back to the chat client 728 using a similar "Publish/Subscribe" mechanism over the MOM broker interface 732. In other words, the createBookmark( ) native viewer function is not synchronous. An asynchronous thread picks up the request for bookmark creation, creates the bookmark and sends the created bookmark and bookmark identifier back to the chat client 728 using a similar "Publish/Subscribe" mechanism over the MOM broker interface 732.

Once the current bookmark is silently obtained, the chat client 728 sends the procedure or study identifier of the currently loaded study along with the newly created bookmark to the second device 710 across the established messaging pipeline. In certain examples, the bookmark is sent as an XML stream or as a raw data attachment over the messaging pipeline (e.g., the XMPP pipeline). In another example, a bookmark identifier could be sent instead of the bookmark. The communication session (e.g., XMPP communication session) is SSL-enabled at the transport layer so all communication is encrypted.

The chat client 730 of the second device 710 receives the procedure or study identifier and launches its viewer 726 with the identified procedure or study. The viewer 726 is launched, for example, by invoking an integration engine or IVAPI pipeline to start a new viewer session. The chat client 730 also receives the created bookmark and sends across the MOM broker interface 732 a new command message to invoke a native viewer function to inject the provided bookmark payload into the viewer 726. In the example in which a bookmark identifier is sent, the chat client 728 sends across the MOM broker interface 732 a command message to invoke a native viewer function to obtain the bookmark for the provided bookmark identifier from the database in which it is stored (e.g., the imaging services manager 720 or the external database 722), prior to injecting the bookmark payload into the viewer 726.

B. Cross-Enterprise Smartlink

Figure 9:
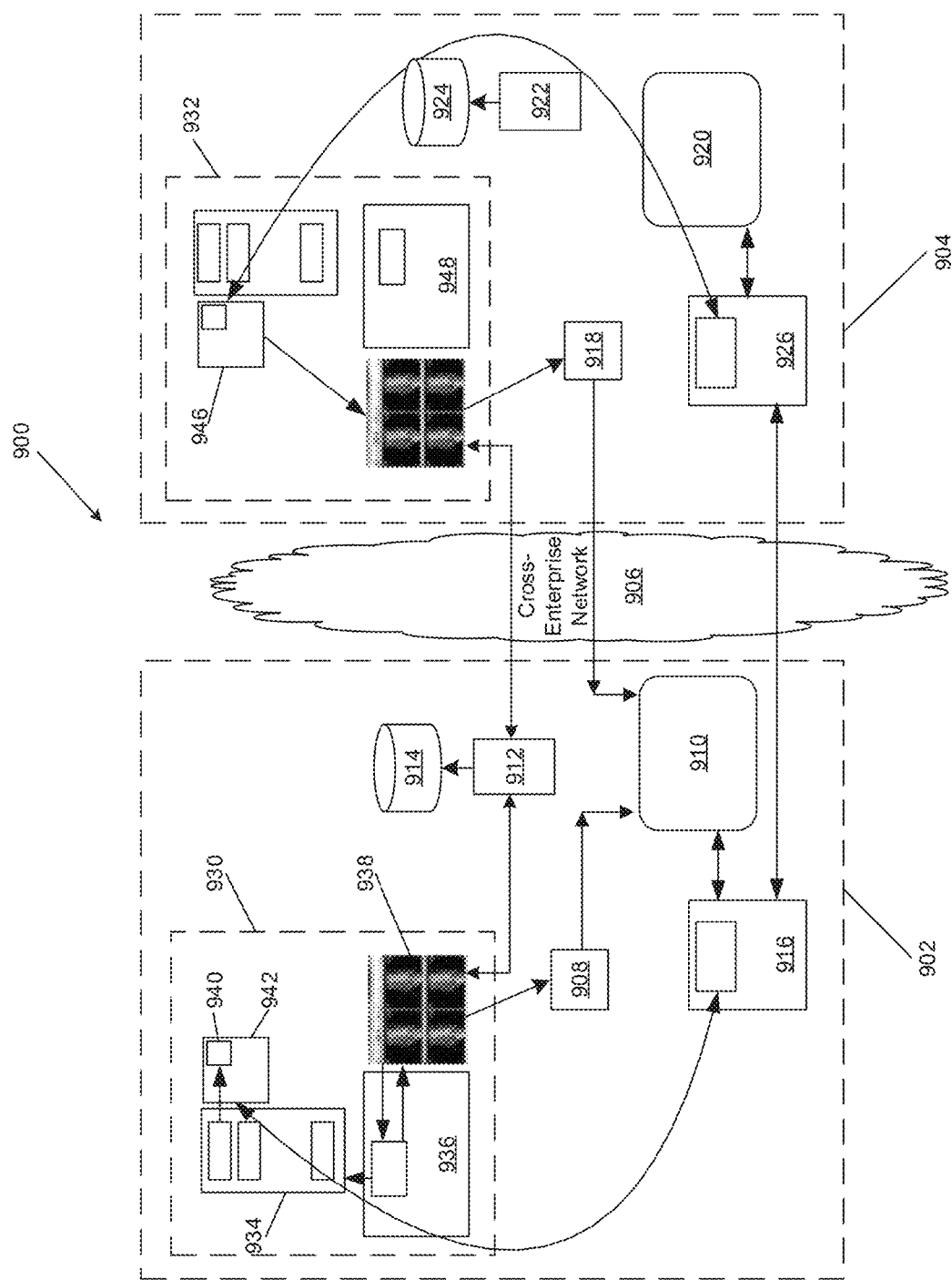
FIG. 9 illustrates cross-enterprise medical diagnostic collaboration including sharing a discrete state of a medical study by passing a remote study identifier.
Figure 10:
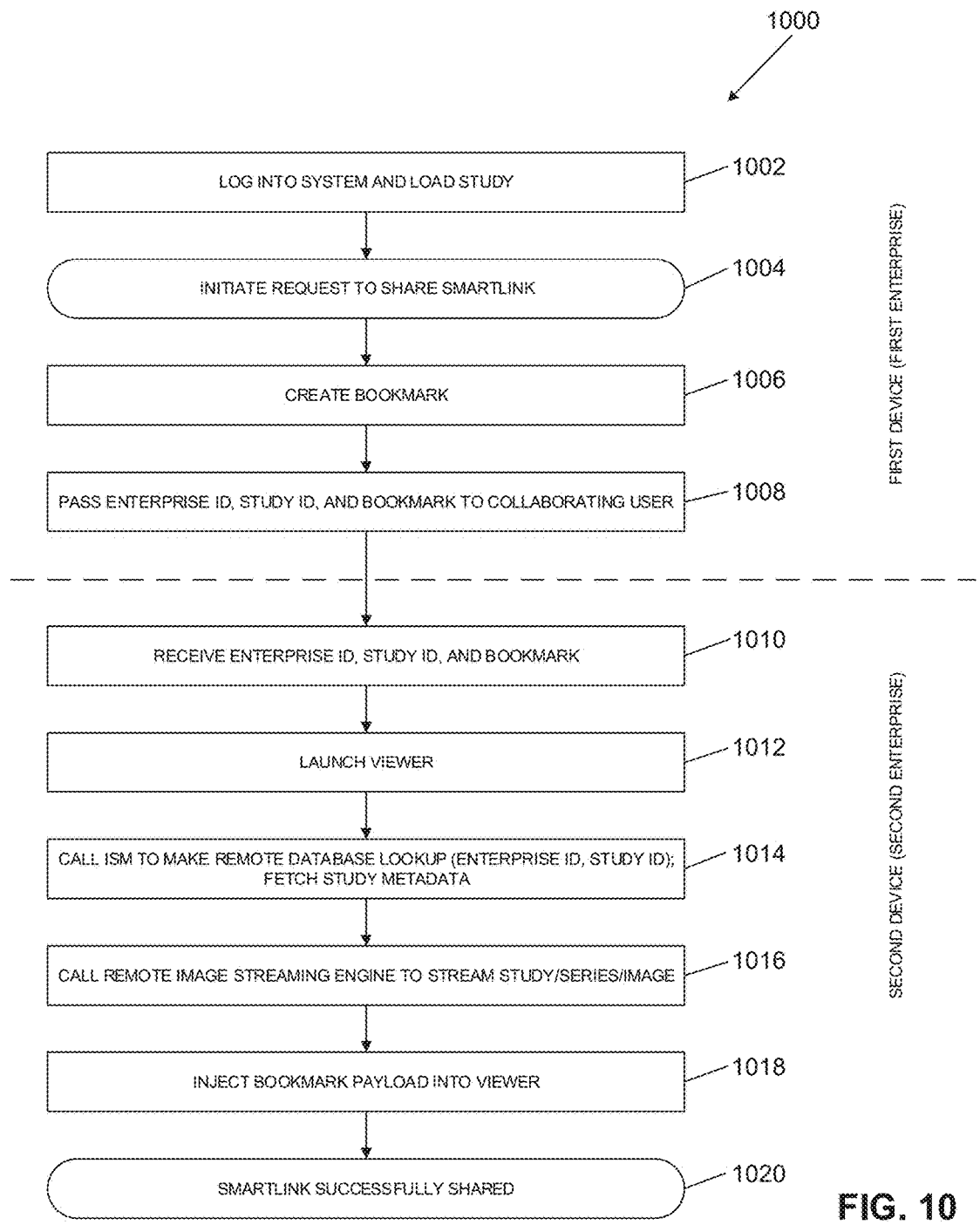
FIG. 10 illustrates cross-enterprise medical diagnostic collaboration including sharing a discrete state of a medical study by passing a remote bookmark identifier.
Figure 11:
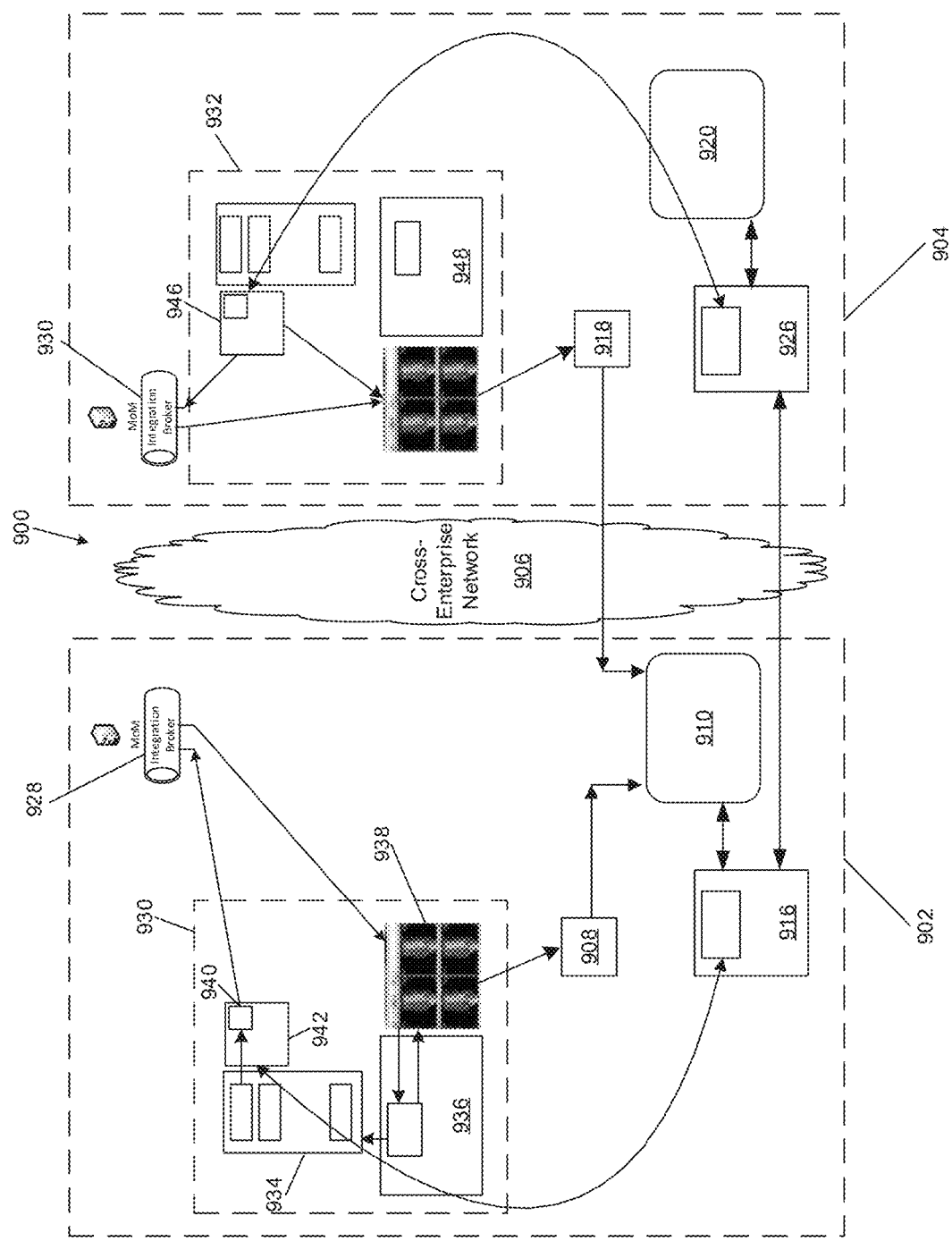
FIG. 11 illustrates a flow diagram of an example method of cross-enterprise medical diagnostic collaboration including sharing a discrete state of a medical study by passing a remote study identifier.

Certain examples, such as the systems of FIGS. 9 and 11, for example, support Smartlink integration for cross-enterprise collaboration. FIG. 9 illustrates Smartlink integration for cross-enterprise collaboration by passing a remote study identifier, which is illustrated in the flow diagram of FIG. 10. FIG. 11 illustrates Smartlink integration for cross-enterprise collaboration by passing a remote bookmark identifier, which is illustrated in the flow diagram of FIG. 12.

Turning to FIG. 9 a medical diagnostic collaboration system 900 that supports cross-enterprise collaboration is illustrated. The system 900 includes a first enterprise 902 and a second enterprise 904. Each of the first and second enterprises 902, 904 include a plurality of users, such as radiologists, referring physicians, and sub-specialists, among others. In certain examples, the first and second enterprises 902, 904 are located in different logical and physical domains separated by a cross-enterprise network 906.

In certain examples, the first enterprise 902 includes a first ISM 908, a first database 910, a first image streaming engine 912, a first image repository 614 (e.g., enterprise archive), and a first collaboration server 916. Similarly, the second enterprise 904 includes a second ISM 918, a second database 920, a second image streaming engine 922, a second image repository 924 (e.g., enterprise archive), and a second collaboration server 926.

FIG. 10 illustrates the medical diagnostic collaboration system 900 of FIG. 9 and further including a first integration broker 928 of the first enterprise 902 and a second integration broker 930 of the second enterprise 904.

In an example, each of the first and second collaboration servers 916, 926 runs a local copy of an application server, such as OPENFIRE®, for example. The server name and service name (e.g., the OPENFIRE® XMPP domain) of the collaboration servers 916, 926 are DNS resolvable to a static Internet Protocol (IP) address.

Application servers (e.g., OPENFIRE® servers) facilitate connections between servers (e.g., server-to-server, or "s2s" connections) to allow users of different servers, which can reside on different physical domains, to communicate or "federate" traffic (e.g., XMPP traffic) therebetween. In certain examples, s2s communications on a pre-configured port (e.g., 5269) are enabled between each server (e.g., the first and second collaboration servers 916, 926) before messages are communicated between the servers.

In certain examples, a connection is established between the first and second collaboration servers 912, 926 on request by the users of the respective servers. The configurations of the respective first and second collaboration servers 912, 926 are limited to security related settings and technical parameters. The s2s connection is started as soon as a contact is added to a client rooster that does not belong to the server to which a user is connected. For example, the system 900 includes a first device 930 within the first enterprise 902 and a second device 932 within the second enterprise 904. The first device 930 includes an IM/Presence application 934, which includes a roster list. The roster list includes one or more contacts of the user of the first device 930. Each of the contacts is managed by server in an enterprise, such as the first collaboration server 916. In an example, the user of the first device 930 can add a contact to his/her roster list that does not belong to the system of the first collaboration server 930. For example, the added contact can be managed by the second collaboration server 926. Once the contact is added, a connection is established between the first and second collaboration servers 916, 926.

Once server-to-server communication is enabled, traffic (e.g., XMPP traffic) is federated therebetween. This allows a user to look up and add a remote user from a remote server (e.g., OPENFIRE®) domain instance. This also allows a user to send and receive presence updates from remote users and the ability to send and receive chat messages from remote users. The s2s communications link (e.g., the OPENFIRE® communications link enabled by the above-mentioned configuration) federates traffic (e.g., XMPP traffic) between multiple distributed servers (e.g., OPENFIRE® servers).

FIG. 10 illustrates a flow diagram of an example method 1000 of cross-enterprise collaboration of the system 900 including Smartlink integration by passing a remote study identifier. In this example, the user of the first device 930 logs into the first enterprise 902 at 902 and loads a study. To load a study, the imaging desktop 936 launches the viewer 938 with a node identifier for the first enterprise 902 along with a valid study identifier to locate the study in the first enterprise 902. The local ISM 908 of the first enterprise 902 is called to obtain the study file. The ISM 908 is contextually and site-aware that this is a local exam read and serves up the image study file (e.g., a file consisting of image location meta-information). The viewer 938 calls the image streaming engine 912 to stream the related study/series/images pixel information into its respective viewports.

At 1004, the user of the first device 930 initiates a request to share a Smartlink with the user of the second device 932. This is accomplished, for example, by clicking a Smartlink icon 940 within a chat window 942 of the first device 930.

At 1006, a bookmark is created upon initiating a Smartlink. The first IM/Presence application 934 of the first imaging desktop 936 sends a message to the first viewer 938 to silently create a bookmark. In certain examples, this and other messages are sent via an integration broker (e.g., the first integration broker 928). The first viewer 938 returns to the first IM/Presence application 934 the created bookmark and a bookmark identifier.

At 1008, the chat client 942 within the first IM/Presence application 934 of the first device 930 (e.g., the local collaborating user) passes the enterprise site identifier (e.g., of the first enterprise 902), the study identifier, and the locally created bookmark over the federated messaging pipeline (e.g., XMPP pipeline) to the second device 932.

At 1010, the second device 932 receives the enterprise identifier, the study identifier, and the bookmark from the first device 930. In an example, the enterprise identifier, the study identifier, and the bookmark are received via an XML stream within the messaging (e.g., XMPP) pipeline, for example, or as a raw data attachment.

At 1012, the second device 932 launches the second viewer 644.

At 1014, the second viewer 944 calls the second ISM 918. The second ISM 918, which is aware of the context and site of the received identifiers and bookmark, is capable of recognizing that the study belongs to a cross-enterprise site (e.g., the first enterprise 902). Upon recognition, the second ISM 918 makes a remote database lookup via a published Web Services Description Language (WDSL) interface to the database 910 of the first enterprise 902 to retrieve the study file meta-data.

At 1016, the second viewer 944 calls the Image Streaming Engine 912 of the first enterprise 902 to stream the subject study/series/image pixel information from the first database 910 into its respective viewports.

At 1018, the chat client 946 of the second device 932 sends (e.g., across the second MOM broker interface 930 of the second enterprise 904) a command message to the second viewer 944 to invoke a native viewer function to inject the provided bookmark payload.

At 1020, the Smartlink is successfully shared between the first device 930 and the second device 932. Thus, the study, as displayed on the first viewer 938 of the first device 930, is replicated in the same state on the second viewer 944 of the second device 932.

Figure 12:
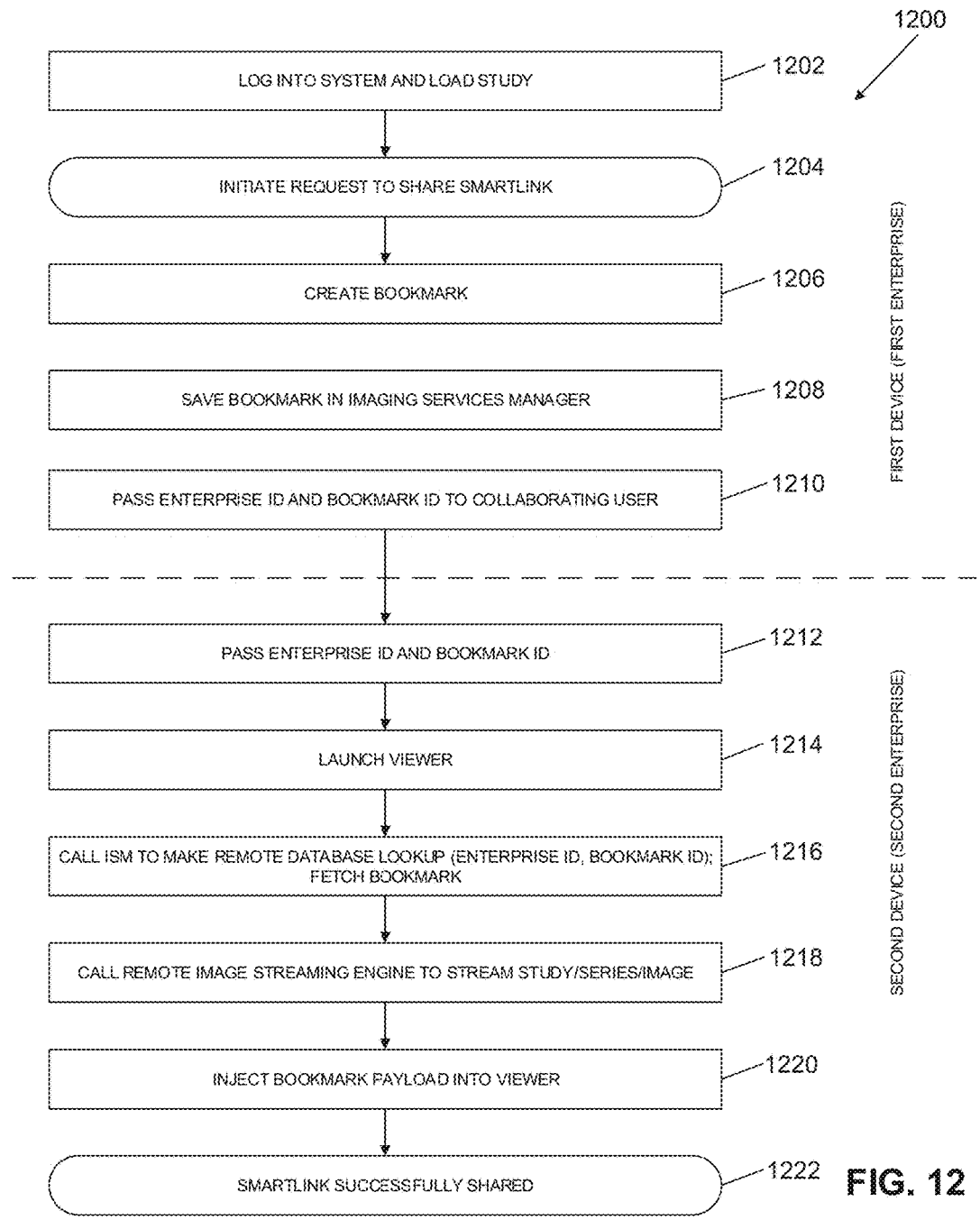
FIG. 12 illustrates flow diagram of an example method of cross-enterprise medical diagnostic collaboration including sharing a discrete state of a medical study by passing a remote bookmark identifier.

FIG. 12 illustrates a flow diagram of an example method 1200 of cross-enterprise collaboration of the system 900 as shown in FIG. 11, including Smartlink integration by passing a remote bookmark identifier. The method 12000 operates similarly to the example method 900 of FIG. 9 except for the payload that is sent from the first device 930 to the second device 932 to facilitate sending a Smartlink, and the corresponding way in which the receiving device (e.g., the second device 932) handles the received payload.

At 1202, a user of the first device 930 logs into the first enterprise 902 and loads a study. At 1204, the user of the first device 930 initiates a request to share a Smartlink with the user of the second device 932.

At 1206, a bookmark is created upon initiating a Smartlink. The first IM/Presence application 934 of the first imaging desktop 936 sends a message to the first viewer 938 to silently create a bookmark. In certain examples, this and other messages are sent via an integration broker (e.g., the first integration broker 928).

At 1208, the first viewer 938 saves the created bookmark into the first imaging services manager 910 and returns the bookmark identifier to the first IM/Presence application 934.

At 1210, the chat client 942 within the first IM/Presence application 934 of the first device 930 passes the enterprise site identifier (e.g., of the first enterprise 902) and the bookmark identifier over the federated messaging pipeline (e.g., XMPP pipeline) to the second device 932.

At 1212, the second device 932 receives the enterprise identifier and the bookmark identifier from the first device 930.

At 1214, the second device 932 launches the second viewer 944.

At 1216, the second viewer 944 calls the second ISM 918. The second ISM 918, which is aware of the context and site of the received identifiers and bookmark, is capable of recognizing that the study belongs to a cross-enterprise site (e.g., the first enterprise 902). Upon recognition, the second ISM 918 makes a remote database lookup via a published Web Services Description Language (WDSL) interface to the database 910 of the first enterprise 902 to retrieve the bookmark by providing the bookmark identifier.

At 1218, the second viewer 944 calls the Image Streaming Engine 912 of the first enterprise 902 to stream the subject study/series/image pixel information from the first database 910 into its respective viewports.

At 1220, the chat client 946 of the second device 932 sends (e.g., across the second MOM broker interface 930 of the second enterprise 904) a command message to the second viewer 944 to invoke a native viewer function to inject the provided bookmark payload.

At 1222, the Smartlink is successfully shared between the first device 930 and the second device 932. Thus, the study, as displayed on the first viewer 938 of the first device 930, is replicated in the same state on the second viewer 944 of the second device 932.

V. Real-Time Collaboration

A. Introduction

Figure 13:
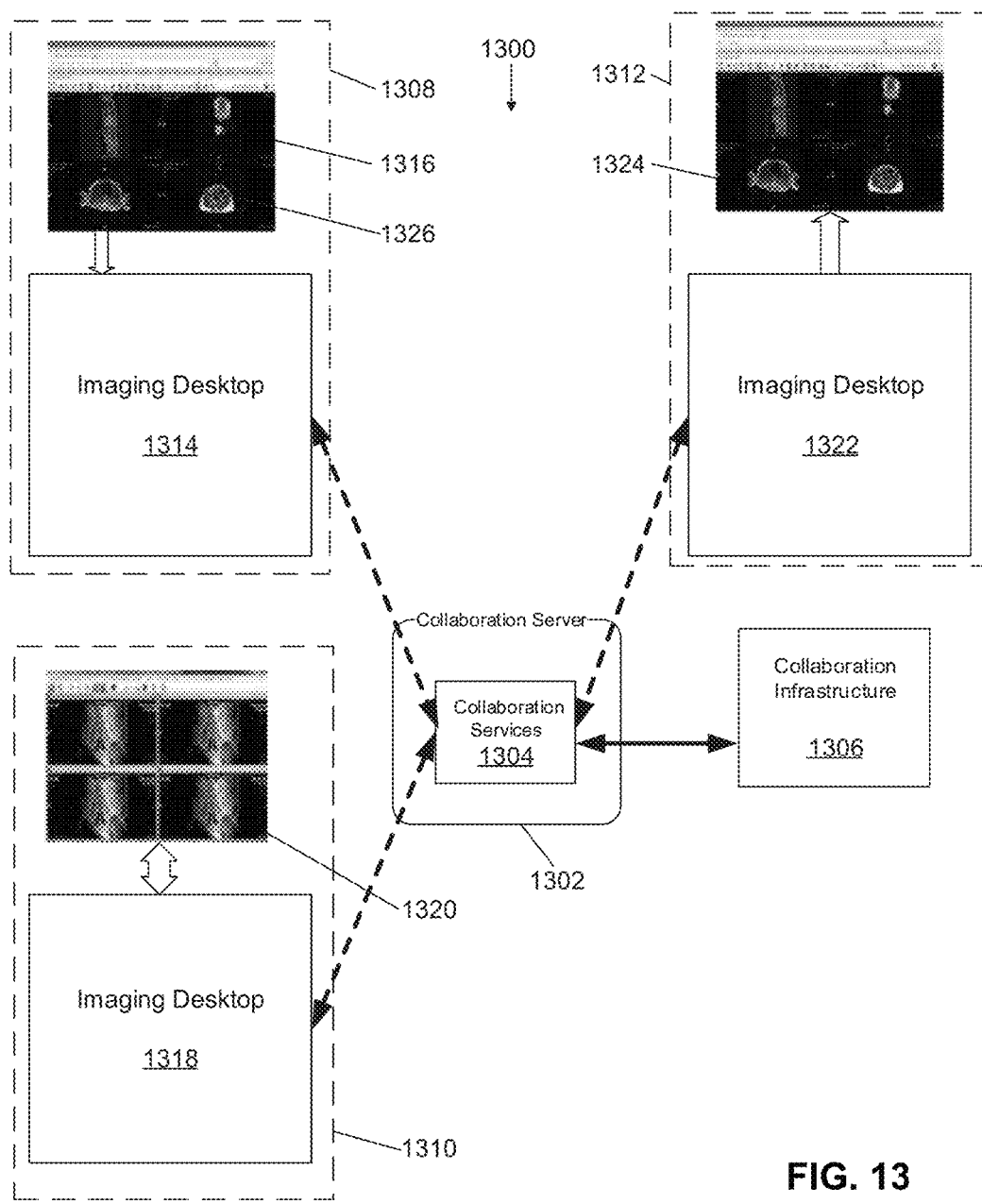
FIG. 13 illustrates an example medical diagnostic collaboration system for real-time collaboration.

FIG. 13 illustrates an example collaboration system 1300, which is capable of real-time collaboration. For the purposes of this disclosure, the term "real-time" and "near real-time" are used interchangeably, and include any time delay introduced, by automated data processing or network transmission, for example, between the occurrence of an event and the use of the processed data. Oftentimes, such time delay is negligible and/or imperceptible to users. However, actual time delay depends on certain factors, such as network speed and processing speed. It will be appreciated that the systems and methods disclosed herein reduce the amount of data that must be transmitted to facilitate collaboration, thereby minimizing any potential time delays.

The collaboration system 1300 includes a collaboration server 1302 that manages a suite of collaboration services 1304, which leverage a collaboration infrastructure 1306 to facilitate medical diagnostic collaboration between multiple devices, such as between a first device 1308, a second device 1310, and a third device 1312. The first device 1308 has a first imaging desktop 1314 and a first viewer 1316, the second device 1310 has a second imaging desktop 1318 and a second viewer 1320, and the third device 1312 has a third imaging desktop 1322 and a third viewer 1324. The first viewer 1316 has one or more viewports 1326. Likewise, each of the second and third viewers 1320, 1324 have one or more viewports.

In certain examples, the medical diagnostic collaboration system 1300 facilitates real-time collaboration, such that "N" devices can interactively share a viewer session across the viewports of each of the devices by providing a real-time communication bus between the "N" devices, thereby facilitating synchronization of their sessions. The real-time communication bus harnesses and controls protocol for session/screen synchronization of viewers. This is a feature of the collaboration server 1302 (or of any of the collaboration servers 102, 502, 702, 916 or 926, among others) logically abstracted through messaging APIs and services. The real-time communication bus supports unidirectional and/or bidirectional and full duplex connectivity with API support for various rendering platforms (e.g., in certain examples, UVx utilizes C++/MFC and ZFP utilizes JS/HTML5). Real-time collaboration can be carried out in a number of ways, as discussed below.

In an example, real-time collaboration can be launched from an instant messaging session between two devices (e.g., between the first device 1308 and the second device 1310 and is assigned a conversation identifier. The real-time collaboration session is initiated by sending study context (e.g., patient, study and image context) in connection with the conversation identifier. The conversation identifier is maintained throughout various collaboration sessions between the collaborating devices in order to maintain a consistent conversation state for all mediums of collaboration (e.g., instant messaging, screen sharing, voice/video sharing, etc.).

A conversation could span multiple sessions including, for example, chat and instant messaging (via, e.g., an OPENFIRE® XMPP server), audio/video chat (via, e.g., CISCO WEBEX®), screen sharing (via, e.g., VSEE®), and/or real-time messaging (via, e.g., WebSockets). A conversation manager of the collaboration server 1302 manages active session threads on all of the different logical protocol stacks, server processes, and backing infrastructure for a set of collaborating entities (e.g., the first, second and third devices 1308, 1310, 1312). The collaboration session manager is configured to manage the lifecycle for each collaboration session that is created. A conversation can span multiple sessions and the collaboration session manager is configured to manage the initiation and the lifecycle of each session.

Existing Viewers (e.g., UVx and ZFP) and study/image pipelines (e.g., EA/Dakota connectors) are used to retrieve and render the images for all participants. 3D imaging applications (e.g., GE HEALTHCARE® Advantage Workstation and IDI MammoWorkstation), available as a plug-in on the smart hanging protocol of the viewer can also be shared.

Viewer capabilities and tools, including the collaboration functional services described in connection with FIG. 3, mimic the study displayed on the viewers of a single device (e.g., unidirectional collaboration) or on the viewers of all collaborating devices (e.g., bidirectional collaboration). In other words, graphic objects, annotations, spatial transforms, window/mouse level commands, ultrasound cine loops, etc., performed on a presenter device (for unidirectional collaboration) or on any collaborating device (for bidirectional collaboration) are effected on the viewers of all other collaborating devices. This is referred to as viewport intelligence. Viewport intelligence indicates that the collaboration session is "situationally aware" of user actions (such as scrolling to a particular series or image) on a particular viewport of the study and broadcasts the event meta-information (event actions and states), to all recipients to get all shared viewports of the viewers in the collaboration session synchronized and "in-band."

The viewer capabilities and tools of each of the devices utilize a vocabulary/stanza to translate manipulation (e.g., event actions and states) on a viewport of a collaborating device into commands that are streamed to other collaborating devices. For example, a GSPS translator of the first device 1308 captures graffiti information of the first viewer 1316 into a structured control protocol using an XML or JSON payload type which is then serialized and streamed to the other collaborating devices via the collaboration server 1302. Viewer capabilities and tools (e.g., GSPS translators) of the other collaborating devices de-serialize the payload and convert the same into a presentation overlay on their respective viewports. Payload transformation services at the collaboration server 1302 manage interim translations from XML to JSON or vice-versa.

An interim translation from XML to JSON is conducted because the collaboration interface model of the ZFP viewer can only bind to a JSON data source. The collaboration interface model of the ZFP viewer is a ViewModel (e.g., in the Model View ViewModel (MVVN) pattern that is implemented in ZFP using the Knockout JavaScript framework) that is essentially a "model of the view," meaning it is an abstraction of the view that also serves in mediating between the view and the model that is the target of the view data bindings. In other words, it is a specialized converter that binds model information into view information and passes commands from the view into the model and vice-versa. Updating the collaboration ViewModel using the above-mentioned JSON translation would result in the ZFP viewer essentially updating its current state view.

In an example, Grayscale Softcopy Presentation State (GSPS per Part-6 DICOM) encoding is used to capture consistently and render presentation state on each respective collaborating viewer. GSPS Translator services parse and create DICOM GSPS from serialized viewport Consistent Presentation of Images (CPI) states. CPI maintains the consistency of presentation for grayscale images and their presentation state information (including, e.g., user annotations, shutters, flip/rotate, display area, and zoom). In an example, the viewport CPI state would be captured upon each event action and serialized into XML. This serialized state can then be streamed to the GSPS translator service running on the collaboration server 1302. The GSPS translator service translates the CPI to DICOM GSPS and sends it onward to the intended collaboration recipient. Such a service is useful if the collaboration technology is used to send source viewport state (serialized into a CPI) to a third party (e.g., SIEMENS® or PHILIPS®) viewer target. Many third-party (e.g., SIEMENS® or PHILIPS®) viewers support DICOM GSPS. Consistently capturing the source viewer state in a DICOM GSPS standards-based manner allows any third-party viewer to interpret the source viewer state and inject the source viewer state information (e.g., represented as GSPS) therein as a graphics overlay, for example.

In certain examples, the collaboration server 1302 maintains the state of a collaboration session by caching data streamed between all collaborating devices within a closed-loop collaboration session. For example, a first set of devices (and corresponding viewers) can be involved in a first collaboration session on a study while second set of devices (and corresponding viewers) are involved in a second collaboration session. The collaboration server 1302 maintains the state of each of the first and second collaboration sessions separately, in connection with the conversation identifiers of the respective collaboration studies. New devices joining either of the first or second collaboration sessions will be streamed the cached state of the collaboration session that they join to synchronize the new devices to the current state of the collaboration session. Moreover, in an example system 1300 with unidirectional collaboration, collaborating devices can easily change "presenter" status by clicking a "make presenter" button, in an example. Furthermore, in an example system 1300 with bidirectional or multidirectional collaboration, a user of a device (e.g., the initiating user) can easily control "presenter" status of one or more devices, such that event actions or states performed on any of the "presenter" devices will be effected on the viewports of all of the other collaborating devices.

In certain examples, the system 1300 utilizes Staged Event-Driven Architecture (SEDA) to provide infrastructure to decompose a processing pipeline of the collaboration server 1302 into a set of stages connected by queues. By performing admission control on each queue, the service can be well-conditioned to load, thereby preventing resources from being overcommitted when demand exceeds service (e.g., GSPS transformation, session management, conversation management, etc.) capacity. SEDA enables a default failover mechanism for guaranteed delivery of collaboration communications. This prevents "out-of-band" scenarios which could potentially become a patient safety issue, and additionally provides high availability and scalability to the system 1300.

Figure 14:
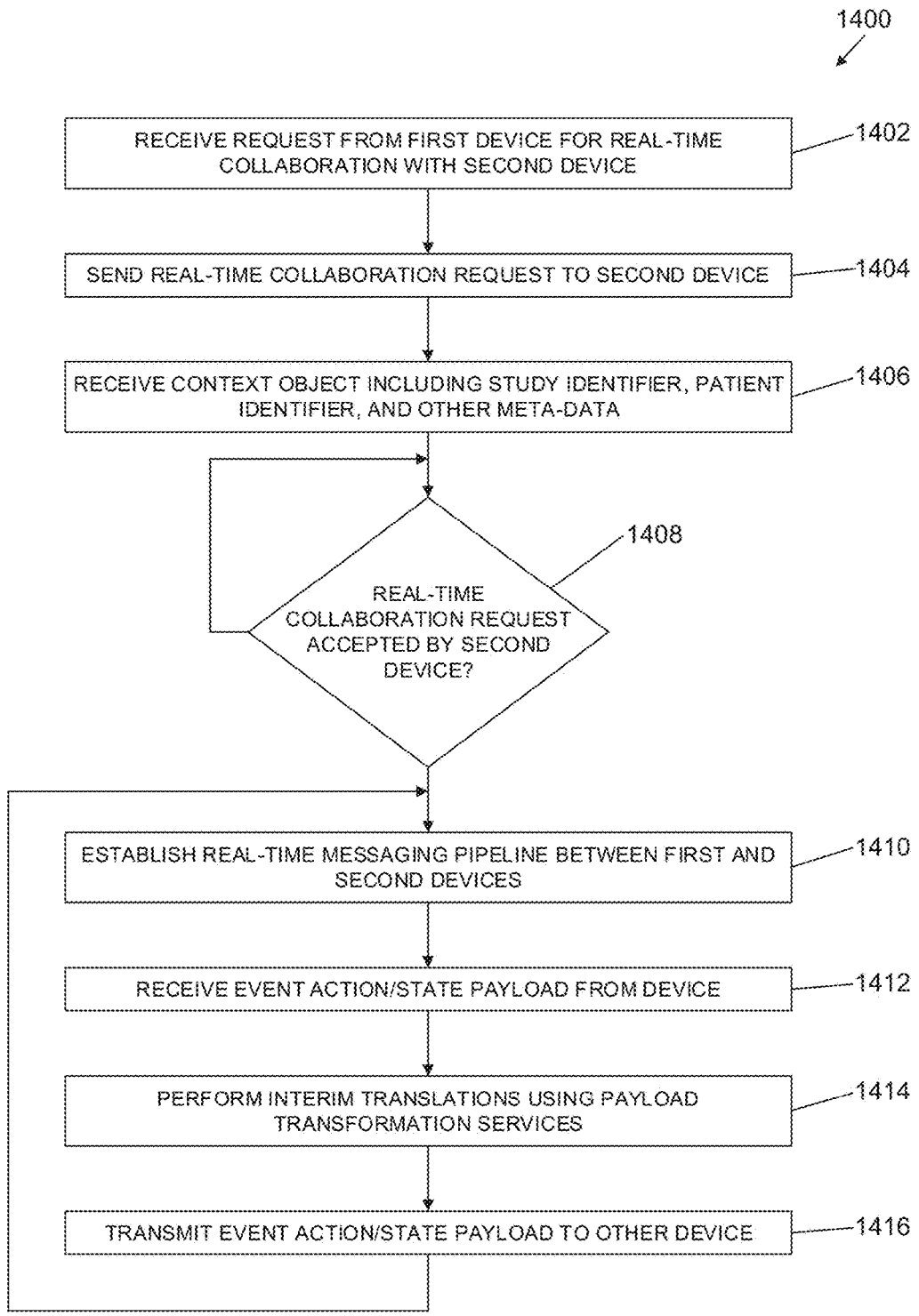
FIG. 14 illustrates a flow diagram of an example method of medical diagnostic collaboration performed by a collaboration server including real-time collaboration.

FIG. 14 illustrates a flow diagram of an example method 1400 of real-time collaboration of the system 1300, as performed by the collaboration server 1302.

At 1402 the collaboration server 1302 receives a request from the first device 1308 for real-time collaboration with the second device 1310.

At 1404, the collaboration server 1302 sends a request to the second device 1310 for real-time collaboration with the first device 1308. The collaboration server 1302 assigns a collaboration identifier to the conversation encompassing the information sent between the first and second devices 1308, 1310. The second device 1310 receives an indication that it received a collaboration request from the first device 1308, and can choose whether to accept or reject the collaboration request.

At 1406, the collaboration server 1302 receives a context object from the first device 1308 describing the current state of the first viewer 1316 of the first device. The context object includes the conversation identifier, the procedure/study identifier, and/or the patient identifier of the study that is open on the first device 1308.

At 1408, the collaboration server 1302 receives an indication that the second device 1310 accepted the collaboration request from the first device 1308.

At 1410, a real-time messaging pipeline is established between the first and second devices 1308, 1310. In an example, the "accept" indication is picked up by a callback JavaScript function on the first device 1308 that invokes a call to a JavaScript function that then uses the current context (procedure, patient, etc.) of the first viewer 1316 to establish a messaging connection session using the conversation identifier. This involves making a call to a RIS/PACS integration component to call the IVAPI, passing in the conversation identifier to re-direct the first viewer 1316 to a WebSocket connection with the collaboration server 1302. The RIS/PACS integration component is used, for example, to enable desktop content sharing between the first imaging desktop 1314 (e.g., GE HEALTHCARE CENTRICITY® RIS-i eRADCockpit) and the first viewer 1316 (e.g., GE HEALTHCARE Universal Viewer for CENTRICITY® PACS and PACS-IW).

At 1412, the collaboration server 1302 receives a payload from the first and/or second devices 1308, 1310, describing event actions and states of their respective viewers 1316, 1324. Business logic at the respective viewers (e.g., the viewers 1316, 1324) capture user interface-level events (e.g., mouse clicks, etc.) along with associated graffiti (e.g., state) information (e.g., ROI, screen co-ordinates in 2-D planar space, relative image aspect ratio, canvas width/height, etc.) into a structured control protocol using an XML or JSON payload type which is then serialized and streamed to the collaboration server 1302.

At 1414, the collaboration server 1302 performs interim translations using payload transformation services as described above.

At 1416, the collaboration server 1302 transmits the translated event action/state payload to the other of the first and/or second devices 1308, 1310 (e.g., the recipient device). Business logic at recipient device (e.g., the first and/or second devices 1308, 1310) de-serializes the payload and converts the same into a presentation overlay on its viewport.

Blocks 1410-1416 repeat throughout the duration of the real-time collaboration session such that any actions or states performed on the first viewer 1316 of the first device 1308 is effected on the second viewer 1324 of the second device 1310 and vice-versa, such that the viewports of the respective viewers 1316, 1324 are synchronized.

Furthermore, although the flow diagram of the example method 1400 of real-time collaboration of the system 1300 is illustrated with respect to real-time collaboration between the first and second devices 1308, 1310, real-time collaboration can be extended to "N" collaboration sessions, each of which can include collaboration between "N" devices, which are managed by the collaboration server 1302.

B. Real-Time Collaboration Utilizing OMG DDS

Figure 15:
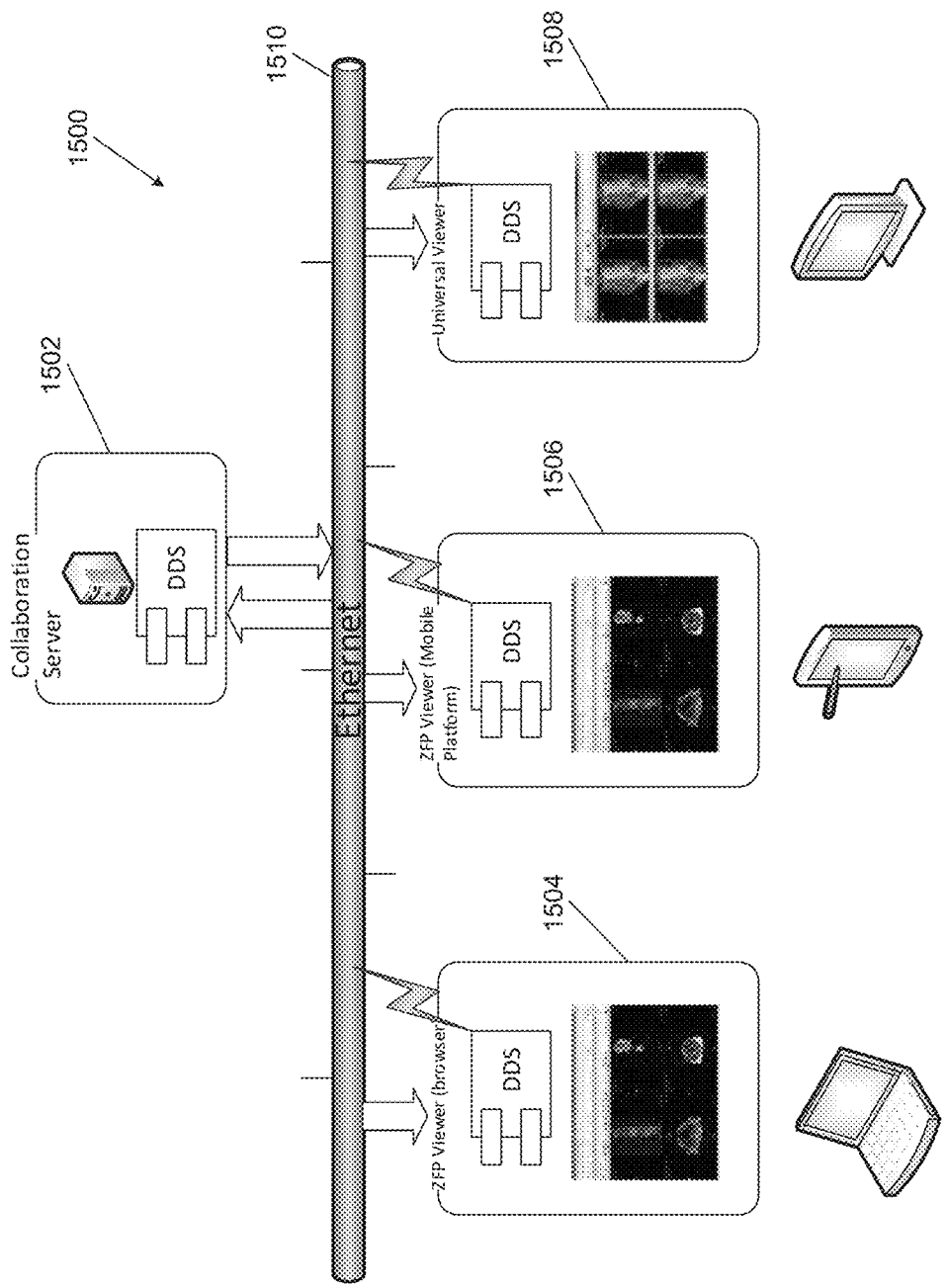
FIG. 15 illustrates a simplified example medical diagnostic collaboration system that utilizes DDS for real-time collaboration.

In certain examples, collaboration systems (e.g., the system 1300) utilize the Object Management Group (OMG) Data-Distribution Service for Real-Time Systems (DDS) standard. FIG. 15 illustrates a simplified example collaboration system that utilizes DDS for real-time collaboration. For brevity and clarity, real-time collaboration utilizing DDS is explained with respect to the simplified system of FIG. 15; however, real-time collaboration utilizing DDS can be carried out through any example system described herein (e.g., the systems 100, 500, 700, 800, 1300, 1500, or any other systems).

The collaboration system 1500 includes a collaboration server 1502 that facilitates medical diagnostic collaboration between a first viewer 1504, a second viewer 1506, and a third viewer 1508, over a network 1510. The system 1500 utilizes the OMG DDS protocol standard for real-time systems (or near real-time systems) using a Publish/Subscribe communication pattern wherein streaming viewport data is delivered with real-time constraints. DDS provides a flexible Publish-Subscribe architecture which the viewers (e.g., the first, second and third viewers 1504, 1506 and 1508, which can be ZFP or UVx viewers, for example) utilize to exchange viewport streaming data (e.g., action commands and states). Each respective viewer in a collaboration conversation is a publisher of data, a subscriber of data or both. The viewers can participate in multi-mode collaborations that can include multiple publishers and subscribers. Each viewer in the collaborative conversation would be a source "publisher" of "raw" data. This "raw" data is then streamed by DDS across the network to interested "subscribers" who are essentially all the other viewers in the collaborative conversation. In an example, the "raw" data is sent to the collaboration server 1502, which performs initial processing on the "raw" data to produce "processed" data that is then published out to all the viewers that are subscribed to the collaboration conversation. Utilizing the concept of dynamic discovery of publishers and subscribers provided by DDS, the collaborating viewers do not have to know of or configure the endpoints for communications because they are automatically discovered by DDS. DDS dynamically discovers endpoint characteristics (e.g., status as a publisher and/or subscriber, data type being published or subscribed to, publisher's communication characteristics and the subscriber's requested communications characteristics, etc.). All of these attributes are taken into consideration during the dynamic discovery and matching of DDS participants. Complementary to dynamic discovery of endpoints, DDS also provides configurable QoS policies on the published and/or subscribed viewport data that affect a variety of aspects of communications, including reliability, performance, persistence of data, and amount of system resources used, among others. DDS is a low-latency communication architecture and while different implementations of DDS will have different performance characteristics, in general all implementations will exhibit high performance. This is because the DDS and RTPS specifications are written to satisfy the requirements of real-time and near real-time systems. This low-latency communication model is important to prevent "out-of-band" scenarios (e.g., if the viewer 1504 has scrolled to the tenth image in a series but the viewer 1506 on the same collaboration conversation has not received the data for that state change yet and is still on the first image in the series). Such a scenario is potentially hazardous and can pose patient safety concerns. DDS by its fundamental characteristic of specifying a compact data encoding on the wire, light-weight notification mechanisms, and the ability for the application to specify QoS policies on the message content itself, allows data transfer implementations that are generally reliable, efficient, low-overhead, and high-performance.

Certain examples utilize OpenDDS (an open-source implementation of the OMG DDS specification) to establish a communication mechanism (using, e.g., the Corba/IIOP protocol) between one or many publishers of and subscribers to a Topic. In addition, the system 1500 can utilize Apache Camel's Routing and Mediation engine complemented by its DDS component adaptor to provide a messaging API "connector" to DDS.

In certain examples, the system 1500 utilizes Advanced Message Queuing Protocol (AMQP) to provide a message-oriented communication pipeline with message delivery guarantees for transport of serialized collaboration session information. In addition, in certain examples, the system 1500 utilizes Staged Event-Driven Architecture (SEDA) to enable a default failover mechanism for guaranteed delivery. Utilization of SEDA prevents "out-of-band" scenarios which could potentially become a patient safety issue. In addition, SEDA provides high-availability and scalability of the system 1500.

C. Real-Time Collaboration Integrated within an Imaging Desktop

Figure 16:
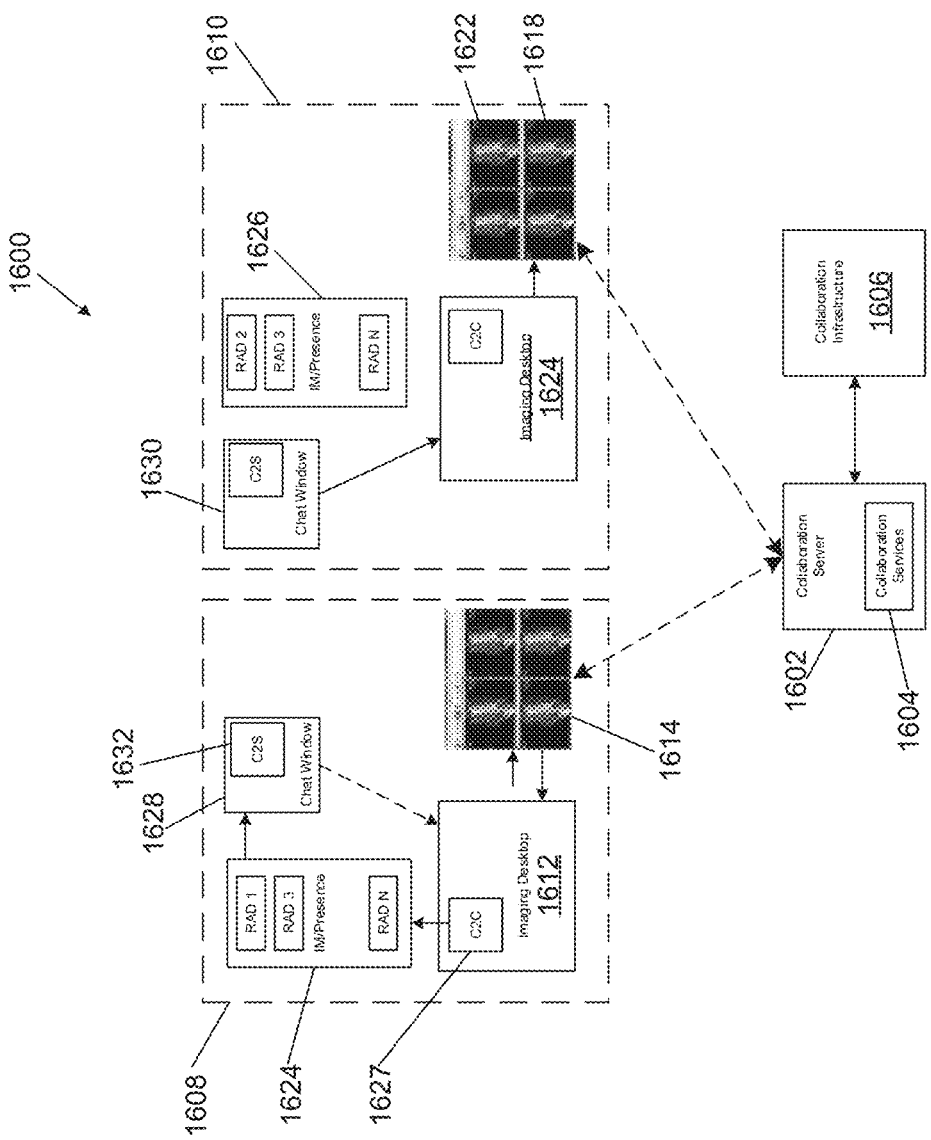
FIG. 16 illustrates an example medical diagnostic collaboration system that utilizes an integrated component for real-time collaboration within an imaging desktop.

FIG. 16 illustrates an example collaboration system 1600 that utilizes an integrated component for real-time collaboration within an imaging desktop. The collaboration system 1600 includes a collaboration server 1602 that manages a suite of collaboration services 1604, which leverage a collaboration infrastructure 1606 to facilitate medical diagnostic collaboration between multiple devices, such as between a first device 1608 and a second device 1610. The first device 1608 has a first imaging desktop 1612 and a first viewer 1614, the second device 1610 has a second imaging desktop 1616 and a second viewer 1618. The first viewer 1614 has one or more viewports 1620 and the second viewer 1618 has one or more viewports 1622. Collaboration between the first and second devices 1608, 1610 is facilitated through a first IM/Presence application 1624 the first device 1608 and a second IM/Presence application 1626 of the second device 1610.

In certain examples, collaboration functions are integrated as a component within the imaging desktops 1612, 1616. For example, the collaboration functions can be built-in as an application development framework (e.g., ORACLE® ADF) component. In an example, a user of the first device 1608 can sign-in to the first imaging desktop 1612, which authenticates the user's credentials with a database on the collaboration server 1602.

Figure 17:
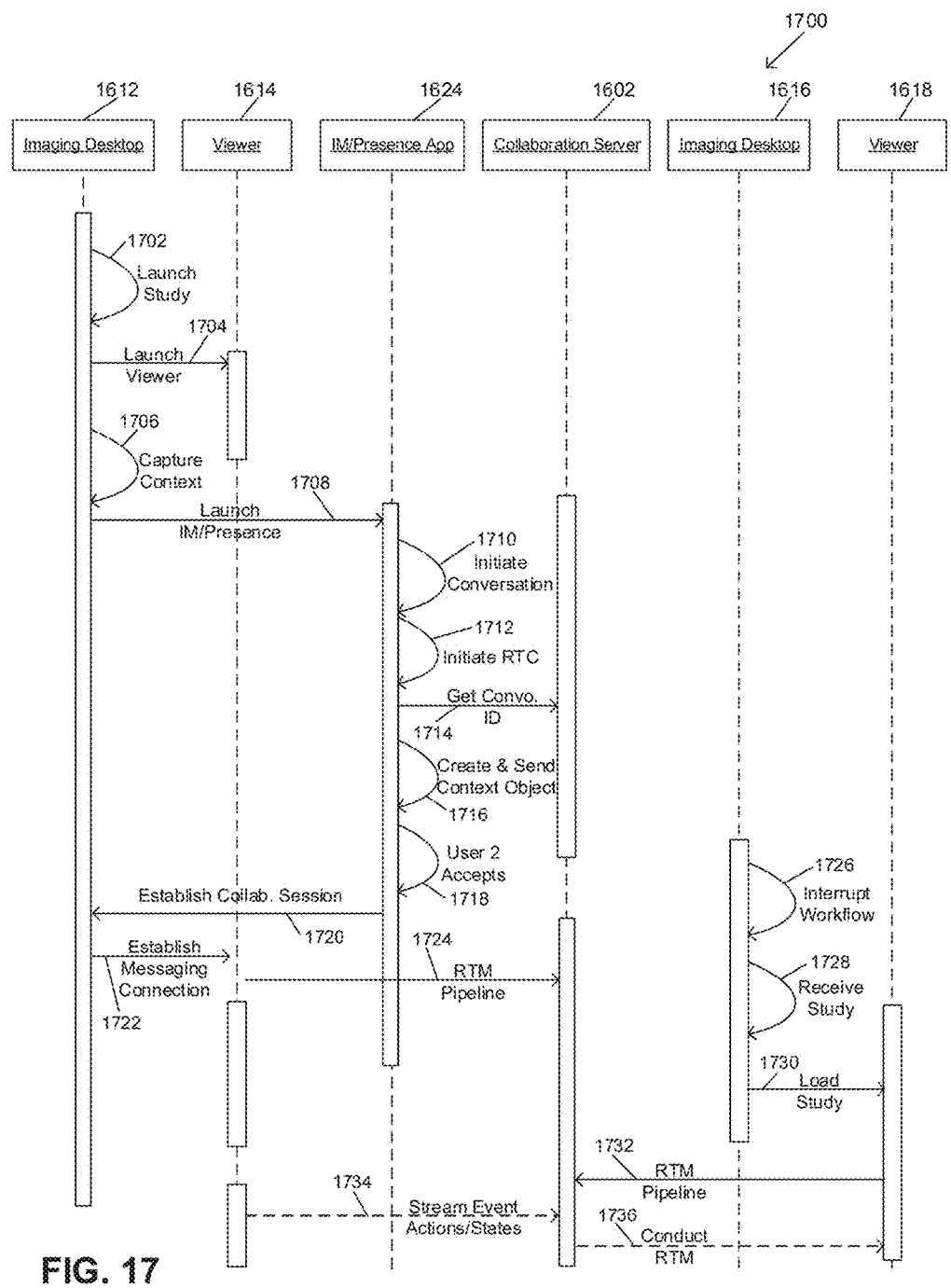
FIG. 17 depicts a data flow diagram illustrating a sequence of events involved in an example real-time medical diagnostic collaboration session of the collaboration system.

FIG. 17 depicts a data flow diagram illustrating a sequence of events 1700 involved in an example real-time collaboration session of the collaboration system 1600. For purposes of illustration, the sequence of events 1700 is described in relation to the system 1600 of FIG. 9, including the first imaging desktop 1612, the first viewer 1614, the first IM/Presence application 1624, the collaboration server 1602, the second imaging desktop 1616, and the second viewer 1618.

The first imaging desktop 1612 has a worklist view to manage the user's (e.g., radiologist's) work, such as unread studies (e.g., exams). The user can launch a study from the worklist to analyze the study and prepare a report including his/her diagnostic results.

At 1702, the user of the first device 1608 launches a study in a reporting screen on the first imaging desktop 1612. The study is identified by a procedure/study identifier and is retrieved from a database (e.g., an enterprise archive, a RIS, a PACS, or an integrated RIS/PACS).

At 1704, the first imaging desktop 1612 launches the first viewer 1614 by invoking the IVAPI and indicating the procedure/study identifier of the study that is loaded on the first imaging desktop 1612. The first viewer 1614 loads the images (e.g., DICOM images) associated with the study in its one or more viewports 1620.

At 1706, the first imaging desktop 1612 captures context of the study. The context includes, for example, the procedure/study identifier, a patient identifier, image information, hanging protocol, and presentation state, such as Grayscale Softcopy Presentation State (GSPS) information, among other things. The context includes any information that is needed to launch a study on a collaborating device.

The worklist view of the first imaging desktop 1612 includes a launcher, such as a collaboration button 1627. In an example, the collaboration button 1627 is labeled "Click-2-Collaborate," or "C2C." Clicking the collaboration button 1627 launches the first IM/Presence application 1624.

At 1708, the user of the first device 1608 launches the first IM/Presence application 1624 by clicking the collaboration button 1627. Upon launching the first IM/Presence application 1624, a messaging pipeline (e.g., XMPP pipeline) is established between the first device 1608 and the collaboration server 1602. For illustrative purposes, FIG. 9 depicts messages sent between chat windows of the respective first and second devices 1608, 1610. In operation, messages are routed through the messaging pipeline (e.g., XMPP pipeline) established with the collaboration server 1602.

The IM/Presence application 1624 includes a roster list (e.g., contact list) of the user of the first device 1608, as well as the associated presence of the contacts within the roster list, such as a user of the second device 1610, for example. The user of the first device 1608 (e.g., the collaboration initiator) can initiate a conversation (e.g., an instant messaging session) with one or more contacts within his/her roster list.

At 1710, the user of the first device 1608 initiates a conversation with the user of the second device 1610. A conversation is initiated, for example, by double clicking a contact on the roster list. Upon initiating the conversation with the user of the second device 1610, a first chat window 1628 opens on the first device 1608 and a second chat window 1630 opens on the second device 1610. In an example, the second imaging desktop 1616 includes a messaging icon to indicate the receipt of a message instead of automatically displaying the message. This allows the user of the second device 1610 to work uninterrupted unless he affirmatively decides to view a message. In an example, multiple messages are queued and the availability thereof is broadcast through the icon.

The user of the first device 1608 can initiate a real-time collaboration session with a contact within his roster list (e.g., the user of the second device 1610) to collaborate on a study that is open in the viewer 1614 of the first device 1608. In an example, a real-time collaboration session is initiated by clicking a launcher, such as a real-time collaboration button 1632, within the first chat window 1628. In an example, the real-time collaboration button 1632 is labeled "Click-2-Share," or "C2S." In other examples, the launcher 1632 is external to the chat window 1628. For example, the launcher 1632 can be in a contextual menu within the IM/Presence application 1624, such that the launcher 1632 is displayed when the user right clicks a contact within his/her roster list.

At 1712, the user of the first device 1608 initiates a real-time collaboration session with the user of the second device 1610 by clicking the collaboration button 1632.

At 1714, the first IM/Presence application 1624 transmits a request to the collaboration server 1602 to retrieve the conversation identifier. The conversation identifier is unique to the present conversation between the first and second devices 1608, 1610. Conversation identifiers are used by a conversation manager on the collaboration server 1602 to track different conversations to ensure that all current conversations (each having its own unique conversation identifier) are synchronized and in a "closed loop."

At 1716, a context object including the conversation identifier, the procedure/study identifier, and/or the patient identifier is created and transmitted to the second device 1610 via the collaboration server. In an example, the context object is transmitted as a message (e.g., an XMPP message) over the messaging pipeline (e.g., the XMPP pipeline). Upon receipt of the context object, the second device 1610 displays a real-time collaboration request, (e.g., an "Accept Share Request" message), which includes options to either "Accept" or "Decline."

At 1718, the user of the second device 1610 accepts the real-time collaboration request. Acceptance is received by a Callback JS function on the first IM/Presence application 1624.

At 1720, first IM/Presence application sends a command to the first imaging desktop 1612 to establish the collaboration session between the first and second devices 1608, 1610.

At 1722, the first imaging desktop 1612 invokes a call to a JS function, which uses the current context (e.g., procedure/study, identifier, patient identifier, etc.) of the first viewer 1614 to establish a messaging connection session using the conversation identifier. This involves making a call to the first viewer 1614, which passes in the conversation identifier to re-direct the first viewer 1614 to a WebSocket connection with the collaboration server 1602.

At 1724, the real-time messaging pipeline is thus established between the first viewer 1614 and the collaboration server 1602.

At 1726, interrupt workflow is invoked upon acceptance of the collaboration request. A JS helper function at the second imaging desktop 1616 launches an interrupt workflow event. As discussed above, interrupt workflow saves an active study into an active work queue on the collaboration server 1602 prior to launching the study in connection with the collaboration request.

At 1728, the second imaging desktop 1616 receives the study from the collaboration server 1602. At 1730, the second imaging desktop 1616 loads the study into the second viewer 1618, and a call is made to direct the second viewer 1618 to a WebSocket connection with the collaboration server 1602.

At 1732, the real-time messaging pipeline is thus established between the second viewer 1618 and the collaboration server 1602. Thus, the first and second devices 1608, 1610 are connected for bi-directional, full-duplex communications. Accordingly, graphic objects, annotations, spatial transforms, window/mouse level commands, ultrasound cine loops, etc., performed on either the first or second devices 1608, 1610 are effected on the viewers of the other collaborating device.

At 1734, the first device 1608 transmits meta-information of event actions and states, performed on the first viewer 1614, to the collaboration server 1602. As described above, viewer capabilities and tools of each of the devices utilize a vocabulary/stanza to translate manipulation (e.g., event actions and states) on a viewport of a collaborating device into commands that are streamed to other collaborating devices.

At 1736, the collaboration server 1602 manages any interim translations that are necessary, and transmits the meta-information to the second viewer 1618. The second viewer 1618 de-serializes the meta-information payload and updates the images displayed thereon to synchronize the images with the current state of the first viewer 1614.

VI. Interrupt Workflow

Interrupt workflow is a feature of the collaboration systems described herein (e.g., the systems 100, 500, 700, 800, 1300, 1500, 1600, etc.) to facilitate seamless transitions between active studies and studies launched through collaboration tools, such as Smartlink or real-time collaboration, for example. Essentially, if a user has a study open when he receives a collaboration request (e.g., a Smartlink or real-time collaboration request) from another user, an interrupt workflow tool automatically saves the active study into a work queue before loading the shared study specified by the collaboration request. Upon closing the shared study, the interrupt workflow tool automatically reverts to the study that was saved into the work queue.

Figure 18:
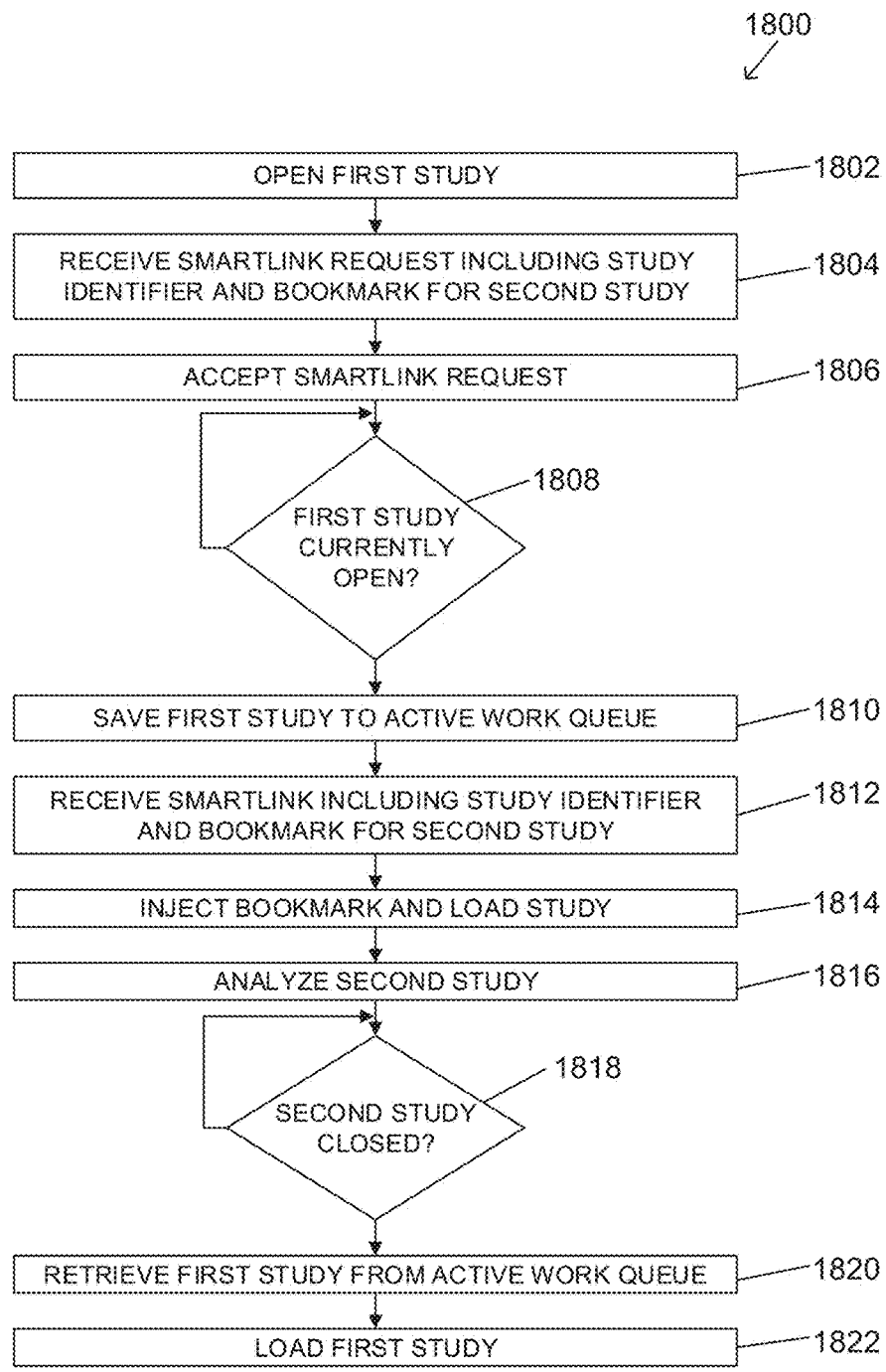
FIG. 18 illustrates a flow diagram of an example method of interrupt workflow, as performed by a collaborating device in a medical diagnostic collaboration system.

FIG. 18 illustrates a flow diagram of an example method 1800 of interrupt workflow, as performed by a collaborating device, such as the second device 1610 of the system 1600 as illustrated in FIG. 16. At 1802, a first study is loaded onto a device, such as the second device 1610.

At 1804, the second device 1610 receives a collaboration request from a device, such as from the first device 1608. The collaboration request includes, for example, a study identifier and bookmark for a second study.

At 1806, the second device 1610 accepts the collaboration request.

At 1808, upon acceptance of the collaboration request, the second device 1610 determines whether a study (e.g., the first study) is currently open and active on the second device 1610.

At 1810, if a study (e.g., the first study) is currently open, the first study is saved to an active work queue. The active work queue can be located in a local or remote database.

At 1812, the second device 1610 receives the collaboration request including, for example, a study identifier and bookmark for the second study from the first device 1608.

At 1814, the second device 1610 (e.g., an imaging desktop 1616 of the second device 1610) injects the bookmark into the second viewer 1618 and loads the study.

At 1816, the user (e.g., a radiologist or clinician) of the second device 1610 analyzes the study, which can include performing diagnoses and drafting reports, among other things.

At 1818, the second device 1610 determines if the second study has been closed.

At 1820, if the second study has been closed, the second device 1610 retrieves the first study from the active work queue in which it was saved.

At 1822, the second device 1610 loads the first study. Thus, the user of the second device 1610 enjoys a seamless transition between an active study and a shared study, without losing any preliminary work performed on the active study.

VII. Conclusion

While an example manner of implementing the medical diagnostic collaboration systems of FIGS. 1, 2, 5, 7, 9, 11, 13 and 16 is illustrated in FIGS. 4, 6, 8, 10, 12, 14, 17 and 18, one or more of the elements, processes and/or devices illustrated in FIGS. 1, 2, 5, 7, 9, 11, 13 and 16 may be combined, divided, re-arranged, omitted, eliminated and/or implemented in any other way. Further, example collaboration servers, collaboration services, collaboration infrastructure, devices, networks, user interfaces, imaging desktops, viewers, and/or, user interfaces, more generally, the example systems of FIGS. 1, 2, 5, 7, 9, 11, 13 and 16 may be implemented by hardware, software, firmware and/or any combination of hardware, software and/or firmware. Thus, for example, any of the example collaboration servers, collaboration services, collaboration infrastructure, devices, networks, user interfaces, imaging desktops, viewers, and/or, user interfaces, more generally, the example systems of FIGS. 1, 2, 5, 7, 9, 11, 13 and 16 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, collaboration servers, collaboration services, collaboration infrastructure, devices, networks, user interfaces, imaging desktops, viewers, and/or, user interfaces, more generally, the example systems of FIGS. 1, 2, 5, 7, 9, 11, 13 and 16 are hereby expressly defined to include a tangible computer readable storage device or storage disk such as a memory, a digital versatile disk (DVD), a compact disk (CD), a Blu-ray disk, etc. storing the software and/or firmware. Further still, the example systems of FIGS. 1, 2, 5, 7, 9, 11, 13 and 16 may include one or more elements, processes and/or devices in addition to, or instead of, those illustrated in FIG. 1-18, and/or may include more than one of any or all of the illustrated elements, processes and devices.

Flowcharts representative of example machine readable instructions for implementing the systems 100, 500, 700, 800, 1300, 1500 and 1600 of FIGS. 1, 2, 5, 7, 9, 11, 13 and 16 are shown in FIGS. 4, 6, 8, 10, 12, 14, 17 and 18. In this example, the machine readable instructions comprise a program for execution by a processor such as the processor 1912 shown in the example processor platform 1900 discussed below in connection with FIG. 19. The program may be embodied in software stored on a tangible computer readable storage medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 4, 6, 8, 10, 12, 14, 17 and 18, many other methods of implementing the example systems 100, 500, 700, 800, 1300, 1500 and 1600 may alternatively be used. For example, the order of execution of the blocks may be changed, and/or some of the blocks described may be changed, eliminated, or combined.

As mentioned above, the example processes of FIGS. 4, 6, 8, 10, 12, 14, 17 and 18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of 4, 6, 8, 10, 12, 14, 17 and 18 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 19:
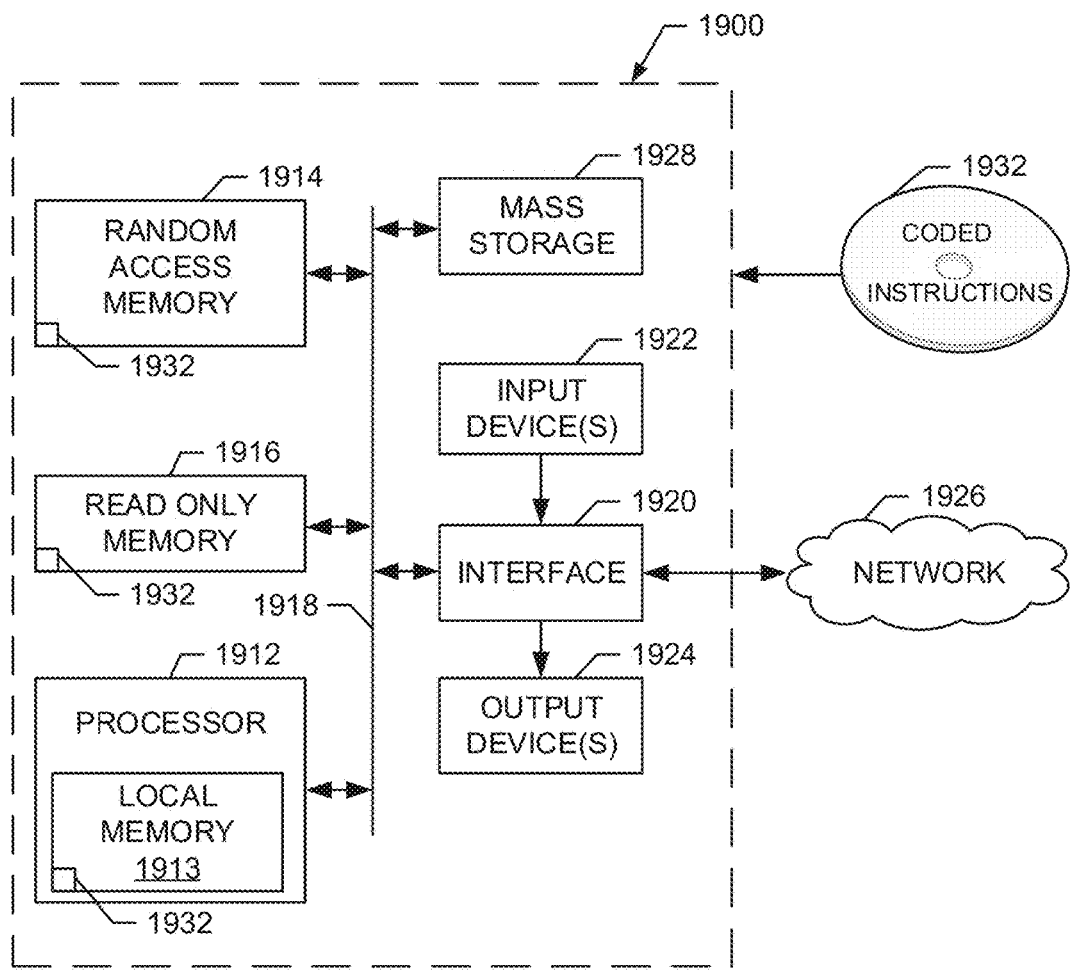
FIG. 19 illustrates an example processor system that may be used to implement example systems and methods disclosed herein.

FIG. 19 is a block diagram of an example processor platform 1900 that may be used to implement the systems and methods described herein such as, e.g., the systems of FIGS. 1, 2, 5, 7, 9, 11, 13 and 16 and the methods of FIGS. 4, 6, 8, 10, 12, 14, 17 and 18. The processor platform 1900 can be, for example, a server, a personal computer, a mobile device (e.g., a cell phone, a smart phone, a tablet such as an iPad™), a personal digital assistant (PDA), an Internet appliance, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.).

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives.

The coded instructions 1932 of FIGS. 4, 6, 8, 10, 12, 14, 17 and 18 may be stored in the mass storage device 1928, in the volatile memory 1914, in the non-volatile memory 1916, and/or on a removable tangible computer readable storage medium such as a CD or DVD.

From the foregoing, it will appreciate that the above disclosed methods, apparatus and articles of manufacture provide numerous benefits to healthcare enterprises, such as improved communication within and between healthcare enterprises, increased confidence in diagnostic findings, and improved access to sub-specialty reading, among others. Ultimately these advantages result in improved patient care and reduced cost.

An example medical collaboration system includes a conversation manager to facilitate a first conversation between a first device and a second device, the first conversation including an exchange of data between the first device and the second device over a network, wherein the first conversation is assigned a first conversation identifier that is maintained throughout the first conversation, and wherein the conversation manager manages a plurality of conversations based on respective conversation identifiers assigned to each of the plurality of conversations; a collaboration session manager to facilitate, via the first conversation, a collaboration session between the first device and the second device, the collaboration session allowing a user of the first device and a user of the second device to view, share, and comment on a medical study; and a context manager to manage context information to describe a state of the medical study as it is displayed on the first device, wherein the collaboration session comprises sharing context information between the first device and the second device to synchronize a state of the medical study displayed on each of the first device and the second device.

In some examples, the first device is within a first healthcare enterprise and the second device is within a second healthcare enterprise. In some examples, the medical collaboration system includes messaging/presence manager configured to: facilitate messaging between the first device and the second device; detect presence of users on a network, wherein presence includes availability or non-availability; manage rosters of each of the users on the network, the rosters of each of the users comprising contacts of each of the users; and broadcast, to each of the users, the presence corresponding to the contacts of each of the users.

In some examples, the context information comprises a bookmark describing a discrete state of the medical study of the first device, as displayed on a viewport of the first device. In some examples, the collaboration session includes synchronizing, in real-time or near real-time, the medical study as displayed on a viewport of the first device, with the medical study as displayed on a viewport of the second device, such that any event actions or states performed on the medical study as displayed on the viewport of the first device are also performed on the medical study as displayed on the viewport of the second device. In some examples, the medical collaboration includes an interrupt workflow tool configured to: save an active study on the second device into an active work queue; load the medical study of the first device onto the second device; and upon the second device closing the medical study of the first device, load, onto the second device, the study from the active work queue. In some examples, the medical collaboration system includes a voice/video sharing tool to share at least one of voice and video between the first device and the second device.

An example tangible computer-readable storage medium including computer program code to be executed by a processor, the computer program code, when executed, to implement a system including a conversation manager to facilitate a first conversation between a first device and a second device, the first conversation including an exchange of data between the first device and the second device over a network, wherein the first conversation is assigned a first conversation identifier that is maintained throughout the first conversation, and wherein the conversation manager manages a plurality of conversations based on respective conversation identifiers assigned to each of the plurality of conversations; a collaboration session manager to facilitate, via the first conversation, a collaboration session between the first device and the second device, the collaboration session allowing a user of the first device and a user of the second device to view, share, and comment on a medical study; and a context manager to manage context information to describe a state of the medical study as it is displayed on the first device, wherein the collaboration session comprises sharing context information between the first device and the second device to synchronize a state of the medical study displayed on each of the first device and the second device.

In some examples, the first device is within a first healthcare enterprise and the second device is within a second healthcare enterprise. In some examples, the tangible computer-readable storage medium includes a messaging/presence manager configured to: facilitate messaging between the first device and the second device; detect presence of users on a network, wherein presence includes availability or non-availability; manage rosters of each of the users on the network, the rosters of each of the users comprising contacts of each of the users; and broadcast, to each of the users, the presence corresponding to the contacts of each of the users.

In some examples, the context information comprises a bookmark describing a discrete state of the medical study of the first device, as displayed on a viewport of the first device. In some examples, the collaboration session includes synchronizing, in real-time or near real-time, the medical study as displayed on a viewport of the first device, with the medical study as displayed on a viewport of the second device, such that any event actions or states performed on the medical study as displayed on the viewport of the first device are also performed on the medical study as displayed on the viewport of the second device. In some examples, the tangible computer-readable storage medium includes an interrupt workflow tool configured to: save an active study on the second device into an active work queue; load the medical study of the first device onto the second device; and upon the second device closing the medical study of the first device, load, onto the second device, the study from the active work queue. In some examples, the tangible computer-readable storage medium includes a voice/video sharing tool to share at least one of voice and video between the first device and the second device.

An example method includes receiving, from a first device, a request to initiate a collaboration session with a second device, the collaboration session including a medical study; receiving, from the second device, an acceptance of the request; establishing the collaboration session between the first device and the second device over a messaging pipeline; and sharing context information between the first device and the second device to synchronize a state of the medical study displayed on each of the first device and the second device. In some examples, the first device is within a first healthcare enterprise and the second device is within a second healthcare enterprise. In some examples, the method includes a messaging/presence manager configured to: facilitate messaging between the first device and the second device; detect presence of users on a network, wherein presence includes availability or non-availability; manage rosters of each of the users on the network, the rosters of each of the users comprising contacts of each of the users; and broadcast, to each of the users, the presence corresponding to the contacts of each of the users. In some examples, the context information comprises a bookmark describing a discrete state of the medical study of the first device, as displayed on a viewport of the first device.

In some examples, the collaboration session includes synchronizing, in real-time or near real-time, the medical study as displayed on a viewport of the first device, with the medical study as displayed on a viewport of the second device, such that any event actions or states performed on the medical study as displayed on the viewport of the first device are also performed on the medical study as displayed on the viewport of the second device. In some examples, the method includes saving an active study on the second device into an active work queue; loading the medical study of the first device onto the second device; and upon the second device closing the medical study of the first device, loading, onto the second device, the study from the active work queue.

An example medical collaboration system includes a collaboration server to obtain a request from a first device to initiate a collaboration session with a second device, the request including a medical study identifier of a first medical study being analyzed on the first device; in response to the request, the collaboration server to receive an acceptance from the second device to participate in the collaboration session; in response to the acceptance and a second medical study being analyzed on the second device, the collaboration server to cause the second medical study to be saved in an active work queue prior to the collaboration session being initiated; in response to the acceptance, the collaboration server to initiate the collaboration session between the first device and the second device by providing a bookmark identifier to the second device, the bookmark identifier enabling access to context information including the medical study identifier and a snapshot of a current state of a viewport of the first device including a description of a discrete state of the first medical study; a collaboration session manager to facilitate the collaboration session between the first device and the second device, the collaboration session manager to provide the second device with the bookmark identifier that loads the snapshot of the viewport of the first device as the medical study in response to the acceptance by the second device, the collaboration session to enable a user of the first device and a user of the second device to view, share, and comment on the medical study, wherein at least one of the collaboration server or the collaboration session manager includes a logic circuit, the collaboration session includes synchronizing, in real-time or near real-time, the medical study as displayed on the viewport of the first device, with the medical study as displayed on a viewport of the second device, such that any event, actions, or states performed on the first medical study as displayed on the viewport of the first device are also performed on the first medical study as displayed on the viewport of the second device, the collaboration server is to cause the second medical study from the active work queue to be loaded onto the second device upon the second device closing the first medical study; a messaging/presence manager to: facilitate messaging between the first device and the second device; detect presence of users on a network, wherein presence includes availability or non-availability; manage rosters of each of the users on the network, the rosters of each of the users including contacts of each of the users; and broadcast, to each of the users, the presence corresponding to the contacts of each of the users.

In some examples, the first device is within a first healthcare enterprise and the second device is within a second healthcare enterprise. In some examples, the medical collaboration system includes a voice/video sharing tool to share at least one of voice and video between the first device and the second device.

An example non-transitory computer-readable storage medium including computer program code to be executed by a processor, the computer program code, when executed, to implement a system comprising: a collaboration server to obtain a request from a first device to initiate a collaboration session with a second device, the request including a medical study identifier of a first medical study being analyzed on the first device; in response to the request, the collaboration server to receive an acceptance from the second device to participate in the collaboration session; in response to the acceptance and when a second medical study is being analyzed on the second device, the collaboration server to cause the second medical study to be saved in an active work queue prior to the collaboration session being initiated; in response to the acceptance, the collaboration server to initiate the collaboration session between the first device and the second device by providing a bookmark identifier to the second device, the bookmark identifier enabling access to context information including the medical study identifier and a snapshot of a current state of a viewport of the first device including a description of a discrete state of the first medical study; a collaboration session manager to facilitate the collaboration session between the first device and the second device, the collaboration session manager to provide the second device with the bookmark identifier that loads the snapshot of the viewport of the first device as the medical study in response to the acceptance by the second device, the collaboration session to enable a user of the first device and a user of the second device to view, share, and comment on the medical study, wherein the collaboration session includes synchronizing, in real-time or near real-time, the first medical study as displayed on the viewport of the first device, with the first medical study as displayed on a viewport of the second device, such that any event, actions, or states performed on the first medical study as displayed on the viewport of the first device are also performed on the first medical study as displayed on the viewport of the second device, wherein the collaboration server is to cause the second medical study from the active work queue to be loaded onto the second device upon the second device closing the first medical study; and a messaging/presence manager configured to: facilitate messaging between the first device and the second device; detect presence of users on a network, wherein presence includes availability or non-availability; manage rosters of each of the users on the network, the rosters of each of the users including contacts of each of the users; and broadcast, to each of the users, the presence corresponding to the contacts of each of the users.

In some examples, the first device is within a first healthcare enterprise and the second device is within a second healthcare enterprise. In some examples, the non-transitory computer-readable storage medium of claim 8, further including a voice/video sharing tool to share at least one of voice and video between the first device and the second device.

An example method includes obtaining a request from a first device to initiate a collaboration session with a second device, the request including a medical study identifier of a first medical study being analyzed on the first device; in response to the request, receiving an acceptance from the second device to participate in the collaboration session; in response to the acceptance and when a second medical study is being analyzed on the second device, causing the second medical study to be saved in an active work queue prior to the collaboration session being initiated; in response to the acceptance, initiating the collaboration session between the first device and the second device by providing a bookmark identifier to the second device, the bookmark identifier including context information including the medical study identifier and a snapshot of a current state of a viewport of the first device including a description of a discrete state of the first medical study, wherein the collaboration session includes synchronizing, in real-time or near real-time, the first medical study as displayed on the viewport of the first device, with the first medical study as displayed on a viewport of the second device, such that any event, actions, or states performed on the first medical study as displayed on the viewport of the first device are also performed on the first medical study as displayed on the viewport of the second device; causing the second medical study from the active work queue to be loaded onto the second device upon the second device closing the first medical study; facilitating messaging between the first device and the second device; detecting presence of users on a network, wherein presence includes availability or non-availability; managing rosters of each of the users on the network, the rosters of each of the users including contacts of each of the users; and broadcasting, to each of the users, the presence corresponding to the contacts of each of the users. In some examples, the first device is within a first healthcare enterprise and the second device is within a second healthcare enterprise.

An example medical collaboration system includes an imaging service manager to provide a first device access to images from a database in response to a request received, the images to be viewed at the first device as first images; a collaboration server to access a request to initiate a conversation between the first device and a second device, in response to the conversation being initiated between the first device and the second device, the collaboration server to generate a study identifier that describes a viewport hanging protocol of the first images at the first device; a conversation manager to: access the images from the database in response to the second device launching the study identifier, the images to be viewed at the second device as second images; organize the second images based on the viewport hanging protocol; and enable the second images to be viewable at the second device to enable real-time collaboration between the first device and the second device.

In some examples, the study identifier includes a current state of a first viewport on the first device. In some examples, the current state of the first viewport includes a first annotation on a first one of the first images, the conversation manager to generate a second annotation on a second one of the second images, the second one of the second images being a replicate of the first one of the first images. In some examples, the second annotation overlays the second one of the second images, the second annotation is a replicate of the first annotation.

In some examples, the conversation manager is to substantially synchronize the first viewport at the first device and a second viewport at the second device. In some examples, the collaboration server is to identify a first action performed on a first one of the first images at the first device and perform a second action on a second one of the second images at the second device, the second action being a replicate of the first action. In some examples, the first action includes an annotation, a measurement, a mouse click, or a user-interface level event. In some examples, the viewport hanging protocol is different than a hanging protocol of the images at the database. In some examples, the study identifier includes meta-information of an event or action at the first device.

An example method includes providing a first device access to images from a database in response to a request received, the images to be viewed at the first device as first images; accessing a request to initiate a conversation between the first device and a second device, in response to the conversation being initiated between the first device and the second device; generating, by executing an instruction with at least one processor, a study identifier that describes a viewport hanging protocol of the first images at the first device; accessing the images from the database in response to the second device launching the study identifier, the images to be viewed at the second device as second images; organizing, by executing an instruction with at least one processor, the second images based on the viewport hanging protocol; and enabling the second images to be viewable at the second device to enable real-time collaboration between the first device and the second device.

In some examples, the study identifier includes a current state of a first viewport on the first device. In some examples, the current state of the first viewport includes a first annotation on a first one of the first images, further including generating a second annotation on a second one of the second images, the second one of the second images being a replicate of the first one of the first images, the second annotation being a replicate of the first annotation. In some examples, the second annotation overlays the second one of the second images. In some examples, the method includes synchronizing the first viewport at the first device and a second viewport at the second device. In some examples, the method includes identifying a first action performed on a first one of the first images at the first device and performing a second action on a second one of the second images at the second device, the second action being a replicate of the first action. In some examples, the first action includes an annotation, a measurement, a mouse click, or a user-interface level event. In some examples, the viewport hanging protocol is different than a hanging protocol of the images at the database. In some examples, the study identifier includes meta-information of an event or action at the first device.

An example tangible computer-readable medium comprising instructions that, when executed, cause a processor to, at least: provide a first device access to images from a database in response to a request received, the images to be viewed at the first device as first images; access a request to initiate a conversation between the first device and a second device, in response to the conversation being initiated between the first device and the second device; generate a study identifier that describes a viewport hanging protocol of the first images at the first device; access the images from the database in response to the second device launching the study identifier, the images to be viewed at the second device as second images; organize the second images based on the viewport hanging protocol; and enable the second images to be viewable at the second device to enable real-time collaboration between the first device and the second device.

In some examples, the study identifier includes a current state of a first viewport on the first device. In some examples, the current state of the first viewport includes a first annotation on a first one of the first images, wherein the instructions, when executed, further cause the processor to generate a second annotation on a second one of the second images, the second one of the second images being a replicate of the first one of the first images, the second annotation being a replicate of the first annotation. In some examples, the second annotation overlays the second one of the second images. In some examples, the instructions, when executed, further cause the processor to substantially synchronize the first viewport at the first device and a second viewport at the second device. In some examples, the instructions, when executed, further cause the processor to identify a first action performed on a first one of the first images at the first device and perform a second action on a second one of the second images at the second device, the second action being a replicate of the first action.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A medical collaboration system, comprising:
   an imaging service manager to provide a first device access to images from a database in response to a request received, the images to be viewed at the first device as first images;
   a collaboration server to access a request to initiate a conversation between the first device and a second device, in response to the conversation being initiated between the first device and the second device, the collaboration server to generate a first study identifier that describes a first viewport hanging protocol of the first images at the first device, the first study identifier includes a current state of a first viewport on the first device;
   a conversation manager to:
      access the images from the database in response to the second device launching the study identifier, the images to be viewed at the second device as second images;
      enable the second images to be viewable at the second device to enable real-time collaboration between the first device and the second device;
      generate a second study identifier that describes a second viewport hanging protocol of the first images at the first device, the first viewport hanging protocol being different than the second viewport hanging protocol; and
      organize the second images displayed at the second device based on the second viewport hanging protocol, wherein the image service manager, the collaboration server, or the conversation manager includes at least one or more processor.

2. The medical collaboration system of claim 1, wherein the current state of the first viewport includes a first annotation on a first one of the first images, the conversation manager to generate a second annotation on a second one of the second images, the second one of the second images being a replicate of the first one of the first images.

3. The medical collaboration system of claim 2, wherein the second annotation overlays the second one of the second images, the second annotation is a replicate of the first annotation.

4. The medical collaboration system of claim 2, wherein the conversation manager is to substantially synchronize the first viewport at the first device and a second viewport at the second device.

5. The medical collaboration system of claim 1, wherein the collaboration server is to identify a first action performed on a first one of the first images at the first device and perform a second action on a second one of the second images at the second device, the second action being a replicate of the first action.

6. The medical collaboration system of claim 5, wherein the first action includes an annotation, a measurement, a mouse click, or a user-interface level event.

7. The medical collaboration system of claim 1, wherein the viewport hanging protocol is different than a hanging protocol of the images at the database.

8. The medical collaboration system of claim 1, wherein the study identifier includes meta-information of an event or action at the first device.

9. A method, comprising:
   providing a first device access to images from a database in response to a request received, the images to be viewed at the first device as first images;
   accessing a request to initiate a conversation between the first device and a second device, in response to the conversation being initiated between the first device and the second device;
   generating, by executing an instruction with at least one processor, a first study identifier that describes a first viewport hanging protocol of the first images at the first device, the first study identifier includes a current state of a first viewport on the first device;
   generating a second study identifier that describes a second viewport hanging protocol of the first images at the first device, the first viewport hanging protocol being different than the second viewport hanging protocol;
   accessing the images from the database in response to the second device launching the study identifier, the images to be viewed at the second device as second images;
   enabling the second images to be viewable at the second device to enable real-time collaboration between the first device and the second device; and
   organizing the second images displayed at the second device based on the second viewport hanging protocol.

10. The method of claim 9, wherein the current state of the first viewport includes a first annotation on a first one of the first images, further including generating a second annotation on a second one of the second images, the second one of the second images being a replicate of the first one of the first images, the second annotation being a replicate of the first annotation.

11. The method of claim 10, wherein the second annotation overlays the second one of the second images.

12. The method of claim 10, further including synchronizing the first viewport at the first device and a second viewport at the second device.

13. The method of claim 9, further including identifying a first action performed on a first one of the first images at the first device and performing a second action on a second one of the second images at the second device, the second action being a replicate of the first action.

14. The method of claim 13, wherein the first action includes an annotation, a measurement, a mouse click, or a user-interface level event.

15. The method of claim 9, wherein the viewport hanging protocol is different than a hanging protocol of the images at the database.

16. The method of claim 9, wherein the study identifier includes meta-information of an event or action at the first device.

17. A non-transitory computer-readable medium comprising instructions that, when executed, cause a processor to, at least:
   provide a first device access to images from a database in response to a request received, the images to be viewed at the first device as first images;

access a request to initiate a conversation between the first device and a second device, in response to the conversation being initiated between the first device and the second device;

generate a first study identifier that describes a first viewport hanging protocol of the first images at the first device, the first study identifier includes a current state of a first viewport on the first device;

generate a second study identifier that describes a second viewport hanging protocol of the first images at the first device, the first viewport hanging protocol being different than the second viewport hanging protocol;

access the images from the database in response to the second device launching the study identifier, the images to be viewed at the second device as second images;

enable the second images to be viewable at the second device to enable real-time collaboration between the first device and the second device; and organize the second images at the second device based on the second viewport hanging protocol.

18. The computer-readable medium as defined in claim 17, wherein the current state of the first viewport includes a first annotation on a first one of the first images, wherein the instructions, when executed, further cause the processor to generate a second annotation on a second one of the second images, the second one of the second images being a replicate of the first one of the first images, the second annotation being a replicate of the first annotation.

19. The computer-readable medium as defined in claim 18, wherein the second annotation overlays the second one of the second images.

20. The computer-readable medium as defined in claim 18, wherein the instructions, when executed, further cause the processor to substantially synchronize the first viewport at the first device and a second viewport at the second device.

21. The computer-readable medium as defined in claim 17, wherein the instructions, when executed, further cause the processor to identify a first action performed on a first one of the first images at the first device and perform a second action on a second one of the second images at the second device, the second action being a replicate of the first action.

* * * * *